(12) United States Patent
Liu et al.

(10) Patent No.: US 12,550,961 B2
(45) Date of Patent: Feb. 17, 2026

(54) SYSTEMS AND METHODS OF A SMART HELMET

(71) Applicant: Polaris Industries Inc., Medina, MN (US)

(72) Inventors: Chiao George Liu, White Bear Lake, MN (US); Andrew J. Berg, Spokane, WA (US); Jeffry J. Steppe, Scandia, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 144 days.

(21) Appl. No.: 18/199,164

(22) Filed: May 18, 2023

(65) Prior Publication Data

US 2023/0397685 A1 Dec. 14, 2023

Related U.S. Application Data

(60) Provisional application No. 63/343,564, filed on May 19, 2022.

(51) Int. Cl.
*A42B 3/04* (2006.01)
*B60W 50/10* (2012.01)
*G06F 3/01* (2006.01)
*G06F 3/0482* (2013.01)

(52) U.S. Cl.
CPC ........... *A42B 3/0433* (2013.01); *B60W 50/10* (2013.01); *G06F 3/011* (2013.01); *G06F 3/0482* (2013.01); *B60W 2710/20* (2013.01); *B60W 2710/22* (2013.01); *B60W 2710/30* (2013.01)

(58) Field of Classification Search
CPC ............ B60W 50/10; A42B 3/04; A42B 3/30
See application file for complete search history.

(56) References Cited

U.S. PATENT DOCUMENTS

| 2013/0305437 A1* | 11/2013 | Weller | G02B 27/0179 |
| | | | 2/422 |
| 2014/0140552 A1* | 5/2014 | Hui | G08G 1/0965 |
| | | | 381/309 |
| 2016/0044276 A1* | 2/2016 | Shearman | A42B 3/042 |
| | | | 348/207.1 |
| 2020/0015537 A1 | 1/2020 | Becker | |
| 2021/0112391 A1 | 4/2021 | Livano | |

(Continued)

FOREIGN PATENT DOCUMENTS

| CN | 201025908 Y | * | 2/2008 |
| KR | 20130028298 | | 3/2013 |
| WO | 2023225600 | | 11/2023 |

OTHER PUBLICATIONS

"International Application Serial No. PCT US2023 067180, International Preliminary Report on Patentability mailed Nov. 28, 2014", 7 pgs.

(Continued)

*Primary Examiner* — Kito R Robinson
*Assistant Examiner* — Roy Rhee
(74) *Attorney, Agent, or Firm* — SCHWEGMAN LUNDBERG & WOESSNER, P.A.

(57) ABSTRACT

A helmet is provided with a shell and an opening wherein a first controller is supported by the shell. A pod is operatively coupled to the first controller and the pod comprises an input device. The input device provides an input to the first controller and the pod is receivable within the opening.

12 Claims, 22 Drawing Sheets

(56) References Cited

U.S. PATENT DOCUMENTS

2022/0225721 A1\* 7/2022 Cafiero .................. A42B 3/245
2022/0229524 A1\* 7/2022 Mckenzie ............. G06F 3/0484
2023/0211790 A1\* 7/2023 Phelps .................. B60W 50/08
                                                              701/1

OTHER PUBLICATIONS

"European Application Serial No. 23808575.7, Response to Communication pursuant to Rules 161(2) and 162 EPC filed Jul. 1, 2025", 11 pgs.

International Search Report and Written Opinion issued by the International Searching Authority, dated Oct. 20, 2023, for International Patent Application No. PCT/US2023/067180; 10 pages.

\* cited by examiner

SYSTEMS AND METHODS OF A SMART HELMET

RELATED APPLICATIONS

The present application claims priority to U.S. Provisional Application Ser. No. 63/343,564, filed on May 19, 2022, titled SYSTEMS AND METHODS OF A SMART HELMET, the entire disclosure of which is expressly incorporated by reference herein.

FIELD OF THE DISCLOSURE

The present disclosure relates to the uses and controls of a smart helmet.

BACKGROUND OF THE DISCLOSURE

Helmets are used to protect wearers and are often configured with additional features to enhance a user's experience.

SUMMARY OF THE DISCLOSURE

In one aspect of the present disclosure, a helmet is provided. The helmet comprising a shell including an opening and a first controller supported by the shell. The helmet comprises a pod operatively coupled to the first controller, and the pod comprises an input device which provides an input to the first controller and the pod is receivable within the opening. Further, the shell comprises a lower edge and the opening intersects the lower edge. Additionally, the pod includes at least one of a radio, a wireless network controller and a global positioning system. The pod is wireless coupled to a second controller and the second controller is one of a second helmet a vehicle and a mobile device. Further, the pod provides a set of instructions to the second controller and the set of instructions includes one of a speed limit a geofence and a communication pathway.

In yet another embodiment of the present disclosure, a helmet is provided. The helmet comprising a shell, a battery supported by the helmet and a mounting assembly positioned on the shell. The mounting assembly comprises an electrical connection coupled to the battery and an accessory received by the mounting assembly. The accessory is configured to be coupled to the battery through the electrical connection. Further, the mounting assembly is positioned at an upper extent of the shell. Additionally, the helmet comprises a user input supported by the shell and the user input is electrically coupled to the electrical connection. The helmet further comprises a controller supported by the shell which is coupled intermediate the user input and the accessory. The controller is configured to alter an accessory characteristic of the accessory in response to an actuation of the user input.

In yet another embodiment of the present disclosure, a method of controlling a vehicle characteristic of a recreational vehicle is provided. The method comprising providing a helmet configured to support a controller and a user input, wherein the user input is operatively coupled to the controller. The user input provides an input to the controller in response to an actuation of the user input. The method further comprising coupling the helmet to the vehicle through a wireless connection and transmitting an output signal from the controller to the vehicle in response to the controller receiving the input signal. The output signal is configured to alter the vehicle characteristic. The method further comprising presenting a list of vehicle characteristics on a user interface remote form the helmet and receiving a selection of a first vehicle characteristic from the list of vehicle characteristics. The method mapping the user input of the helmet to the selected vehicle characteristic such that an actuation of the user input of the helmet alters the selected vehicle characteristic. Further, the user interface is supported by the recreational vehicle. Further, the selected vehicle characteristic is one of a lighting characteristic, a suspension characteristic, a steering characteristic, and a drivetrain characteristic. The method further comprising actuating the user input of the helmet a second time within a predetermined time after the first actuation of the user input and altering a second vehicle characteristic in response to the second actuation of the user input.

In yet another embodiment of the present disclosure, a method of operating a plurality of helmets is provided. The method comprising providing a first group of helmets comprising a first helmet and a second helmet and a second group of helmets comprising a third helmet and a fourth helmet. The method further comprising providing a first wireless connection between the first helmet and the second helmet, a second wireless connection between the third helmet and the fourth helmet, and a third wireless connection between the second helmet and the third helmet. Further, communicating a first information between the first helmet and the fourth helmet by the steps of: transmitting the first information over the first wireless connection from the first helmet to the second helmet, transmitting the first information over the third wireless connection from the second helmet to the third helmet, and transmitting the first information over the second wireless connection from the third helmet to the fourth helmet. Further, the first wireless connection and the second wireless connection are a first type of wireless communication method and the third wireless connection is a second type of wireless communication method.

Further, the method comprises providing a first light coupled to the first helmet, a second light coupled to the second helmet, a third light coupled to the third helmet, and a fourth light coupled to the fourth helmet. The method further comprising displaying a first light characteristic at the first light and the second light, communicating the first light characteristic over the third wireless connection, and displaying a second light characteristic at the third light and the fourth light. The second light characteristic is different from the first light characteristic. Additionally, the first light characteristic and the second light characteristic are one of a light color and a flash sequence. Further, the second type of wireless communication method has a longer range than the first type of wireless communication method. Additionally, the first type of wireless communication method is a Bluetooth communication method and the second type of wireless communication is a wi-fi or a cellular connection. Additionally, the first information may be an audio information.

In yet another embodiment of the present disclosure, a method of controlling an accessory is provided. The method comprising providing a helmet including a user actuatable input and a controller operatively coupled to the user actuatable input. Further providing a user interface communicatively coupled to the controller and providing a plurality of accessories wherein each accessory has an accessory characteristic. Further, the method comprising presenting a plurality of indicia on the user interface, the plurality of indicia comprising the plurality of accessories. The method further comprising selecting one of the accessories of the plurality of accessories with the user interface and mapping the user actuatable input of the helmet to the selected one of the plurality of accessories such that after mapping a first user actuation of the user actuatable input of the helmet alters the accessory characteristic of the selected one of the plurality of accessories. Further, at least one of the accessories of the plurality of accessories is supported by the helmet. Additionally, at least one of the accessories of the plurality of accessories is physically separated from the helmet. The method further comprising providing a power source coupled to the helmet and actuating the user actuatable input provides power to the selected accessory. Further, the selected accessory comprises a heating element. The method further comprising altering an accessory characteristic of a second accessory of the plurality of accessories in response to a second user actuation of the user actuatable input within a predetermined time after the first user actuation of the user actuatable input.

In yet another embodiment of the present disclosure, a helmet to be worn by a passenger of a vehicle is provided. The helmet comprises a shell and a sensor supported by the shell, wherein the sensor is configured to monitor at least one of a passenger characteristic and a vehicle characteristic. Further, a controller is operatively coupled to the sensor and the controller is configured to receive an input from the sensor and determine based on the input an amount of energy imparted to the passenger. Additionally, the controller is further configured to, when the energy imparted to the passenger reaches a first energy threshold, at least one of: (i) provide an audio, visual, or tactile alert to the passenger; and (ii) alter a vehicle characteristic. Additionally, the sensor is one of an accelerometer, a gyroscope, an inertial measurement unit, a biometric sensor, and a suspension sensor. Further, if the energy imparted reaches a second energy threshold, the controller is configured to request a first user input within a first time threshold, and if a user input is not received within the first time threshold, the controller is further configured to request a second user input within a second time threshold. Further, if a user input is not received with second time threshold, the controller is configured to alter the vehicle characteristic. Further, wherein the requested first user input is a request to provide an input to a user interface of the vehicle.

DETAILED DESCRIPTION OF THE DRAWINGS

Figure 1:
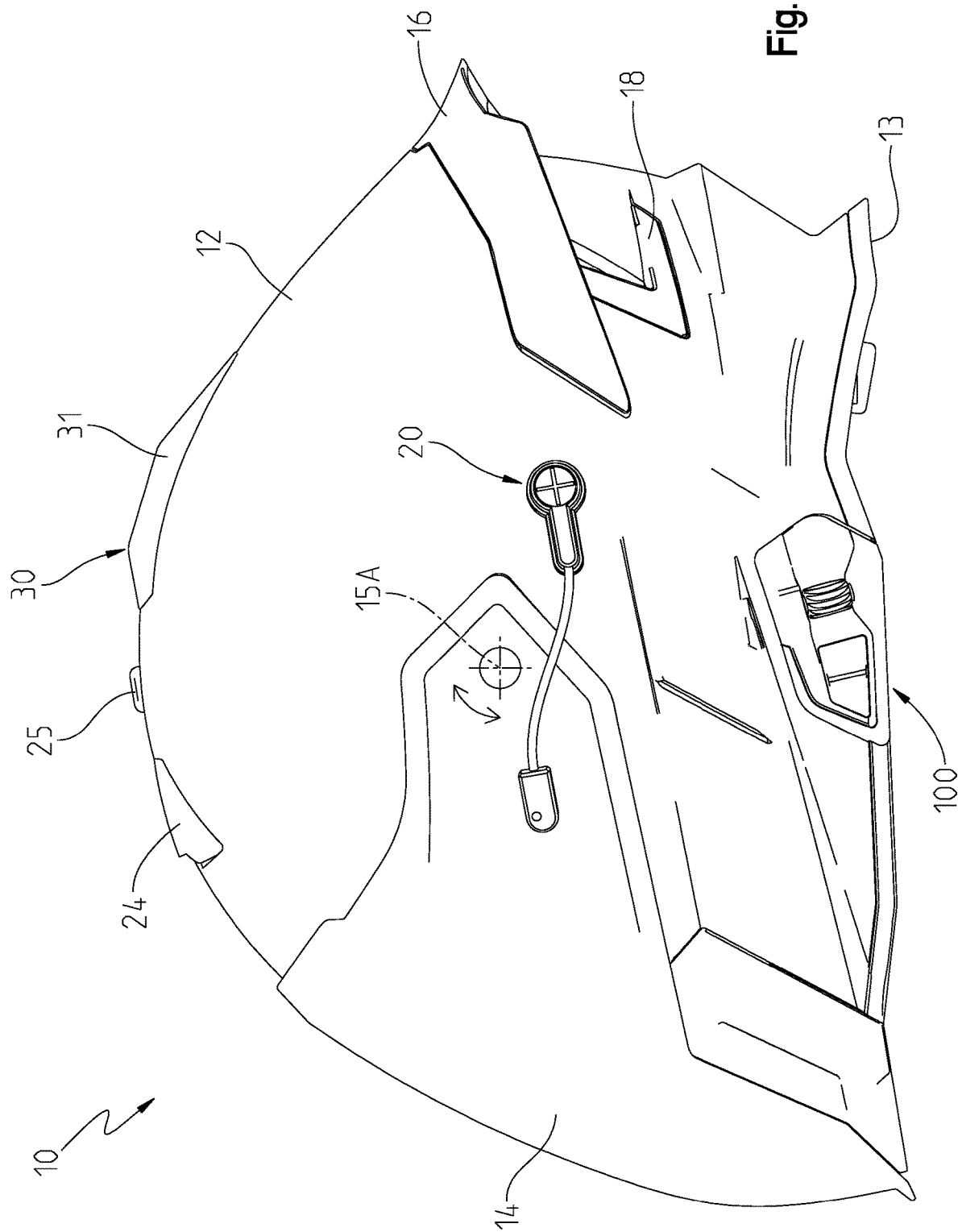
FIG. 1 is a left side view of a helmet of the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

Referring to FIGS. 1-8, a helmet 10 will be described. Helmet 10 includes a shell 12 and a visor 14 supported by the shell 12. In the illustrated embodiment, shell 12 is sized and shaped to receive a head of the user through a lower opening (see FIG. 8) and to surround the circumference of the head of the user of helmet 10. Further, shell 12 and visor 14 provide at least a portion of the outer profile of helmet 10. In the illustrated embodiment, visor 14 is positioned on the front of helmet 10 and is rotatable about a visor pivot axis 15. Illustratively, visor pivot axis 15 extends generally laterally through the helmet 12. In various embodiments, a left side of visor 14 rotates about a visor pivot axis 15A, and a right side of visor 14 rotates about a visor pivot axis 15B. Visor 14 may be rotated about visor pivot axis 15 by a user of helmet 10 which may cover or uncover a portion of the face of the user. In various embodiments, visor 14 may be removable from shell 12 so that helmet 10 is an open-face helmet. In various embodiments, helmet 10 may not have a visor 14 at all.

In the illustrated embodiment, helmet 10 includes a spoiler 16 positioned on a rear of helmet 10. In embodiments, spoiler 16 may support a variety of electronic components (see FIG. 10) including, but not limited to, a controller 50, a global positioning system (GPS) 52, an accelerometer 54, a gyroscope 56, an inertial measurement unit 58 (IMU), a biometric sensor(s) a memory 62, a read only memory (ROM) 64, a radio 66, a wireless controller 68, and a network controller 70 coupled to a network 71. In various embodiments, spoiler 16 may further comprise a charging port (not shown) configured to coupled to a battery (not shown) of helmet 10. In various embodiments, the charging port is a Type USB-C port. In various embodiments, the charging port is any type of suitable port for charging and/or data transfer.

Figure 6:
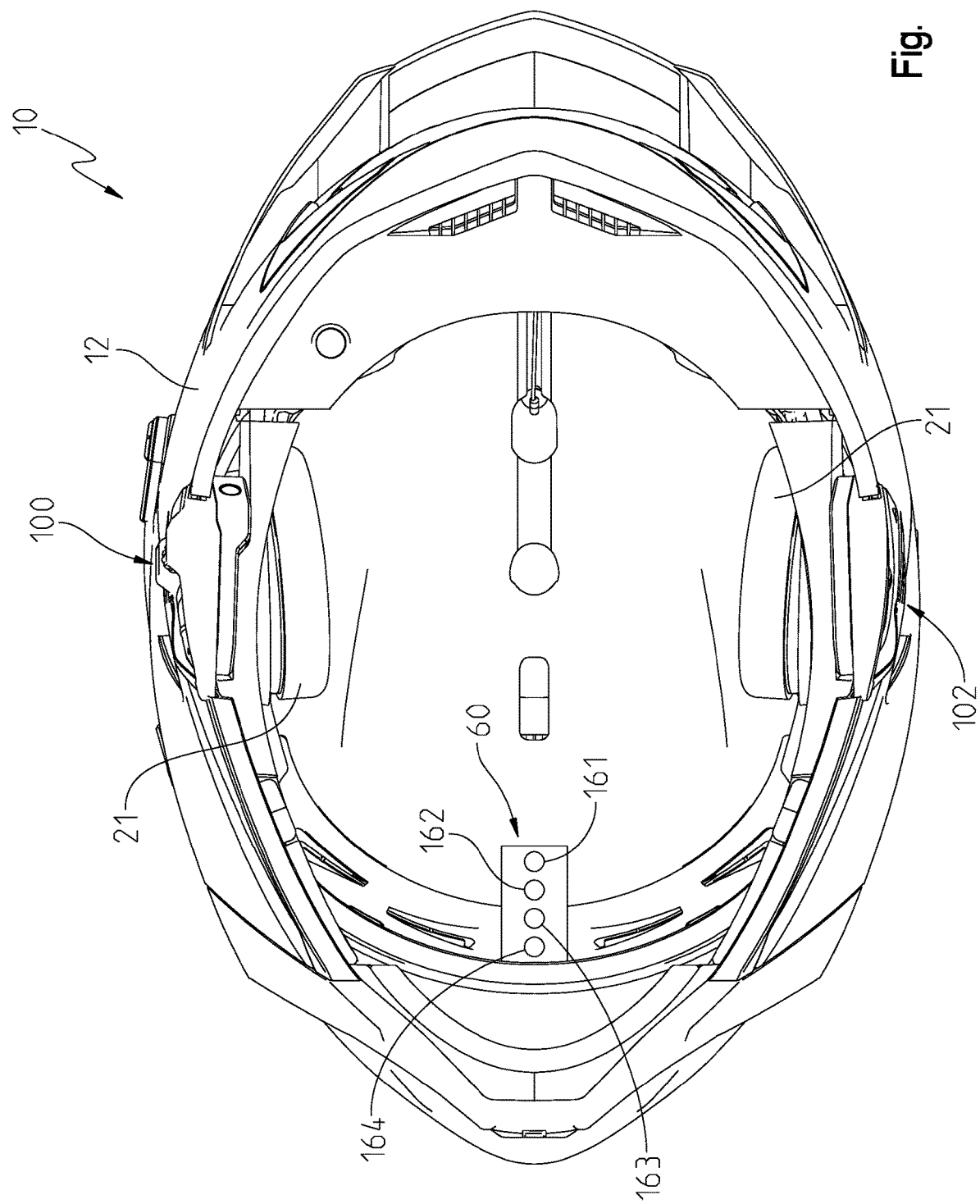
FIG. 6 is a bottom up view of the helmet of FIG. 1.
Figure 7:
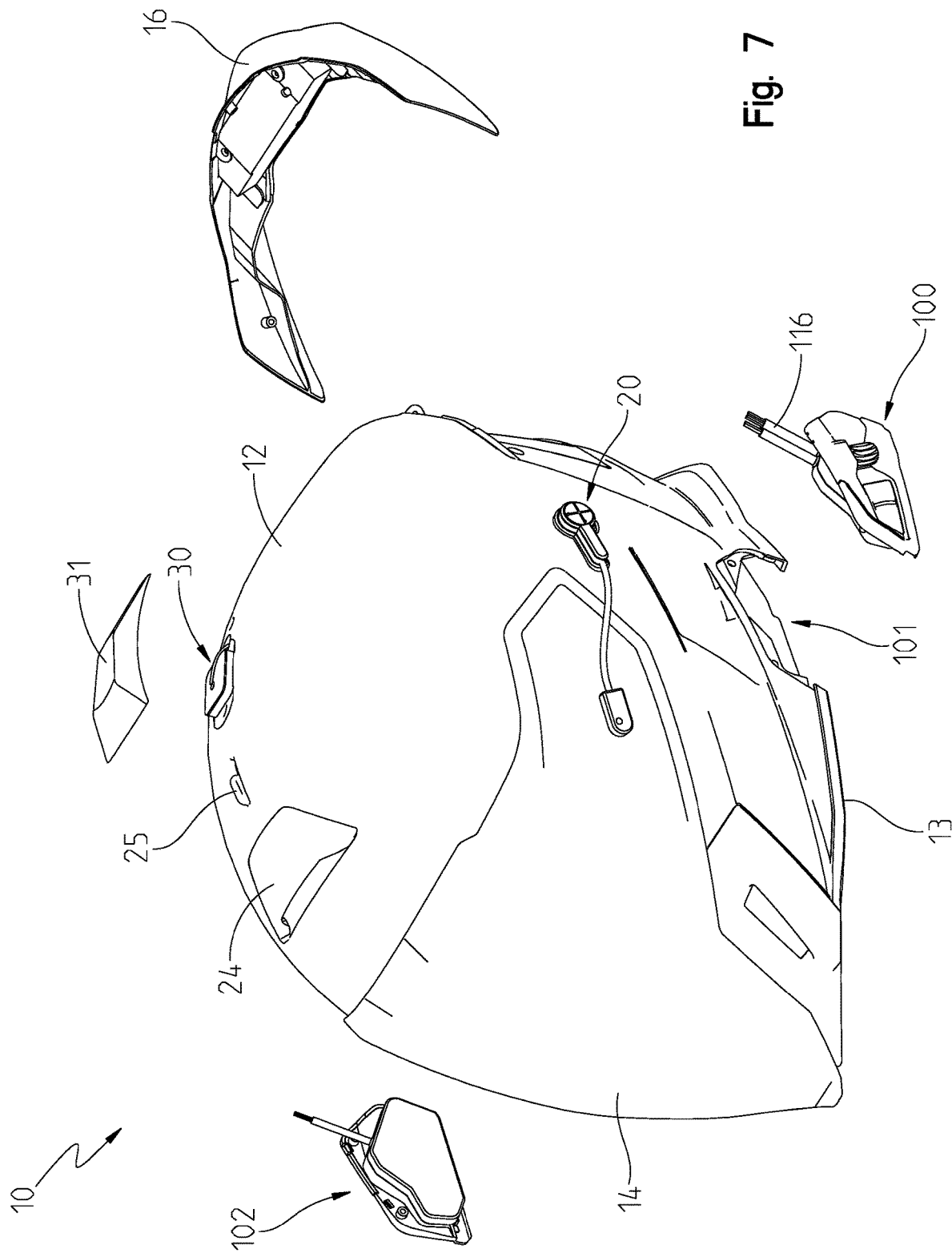
FIG. 7 is an exploded front perspective view of the helmet of FIG. 1.

Referring to FIG. 6, helmet 10 may comprise a plurality of earmuffs 21 which surround a plurality of speakers 22. In the illustrated embodiment, helmet 10 includes two earmuffs 21 and two speakers 22 (see FIG. 8) are coupled to controller 50. Further, helmet 10 includes a microphone 23 and a heating element 91 positioned within a breathbox 90 (see FIG. 8). Illustratively, a single microphone 23 is located near a mouth of a wearer of helmet 10. In various embodiments, helmet 10 may further comprise a plurality of microphones 23 located near, adjacent, or within earmuffs 21 to assist in noise cancellation.

Figure 2:
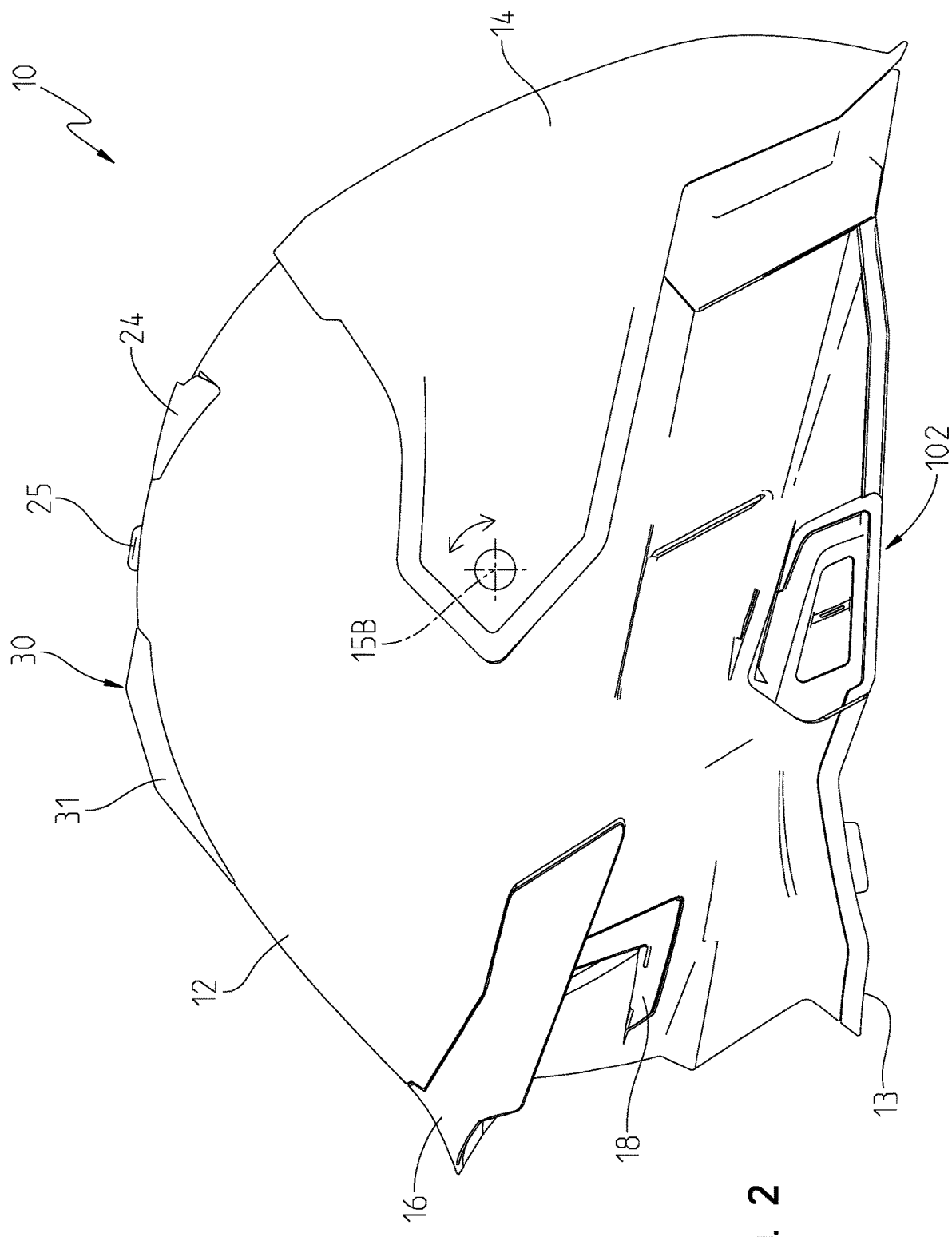
FIG. 2 is a right side view of the helmet of FIG. 1.
Figure 3:
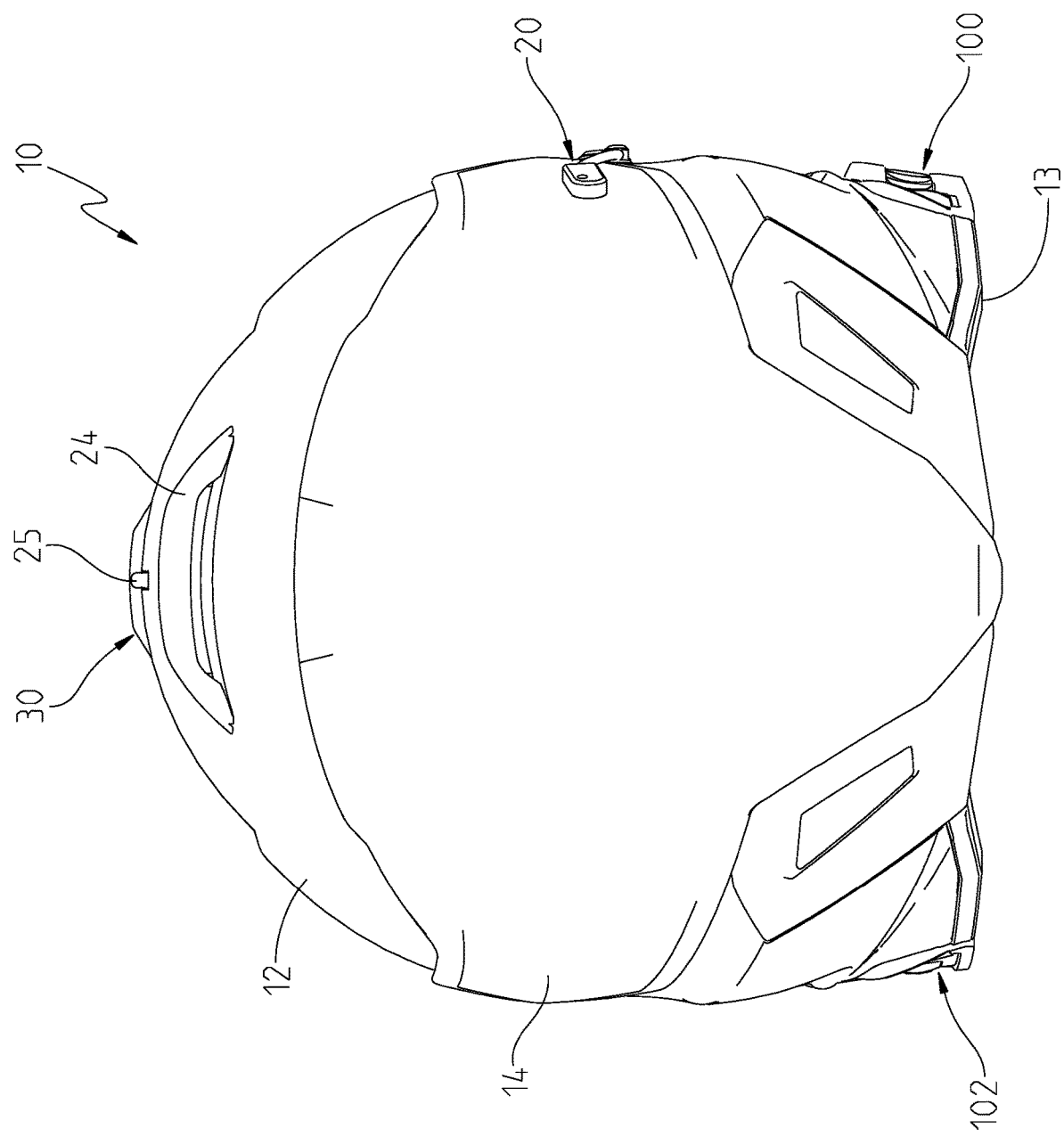
FIG. 3 is a front view of the helmet of FIG. 1.
Figure 4:
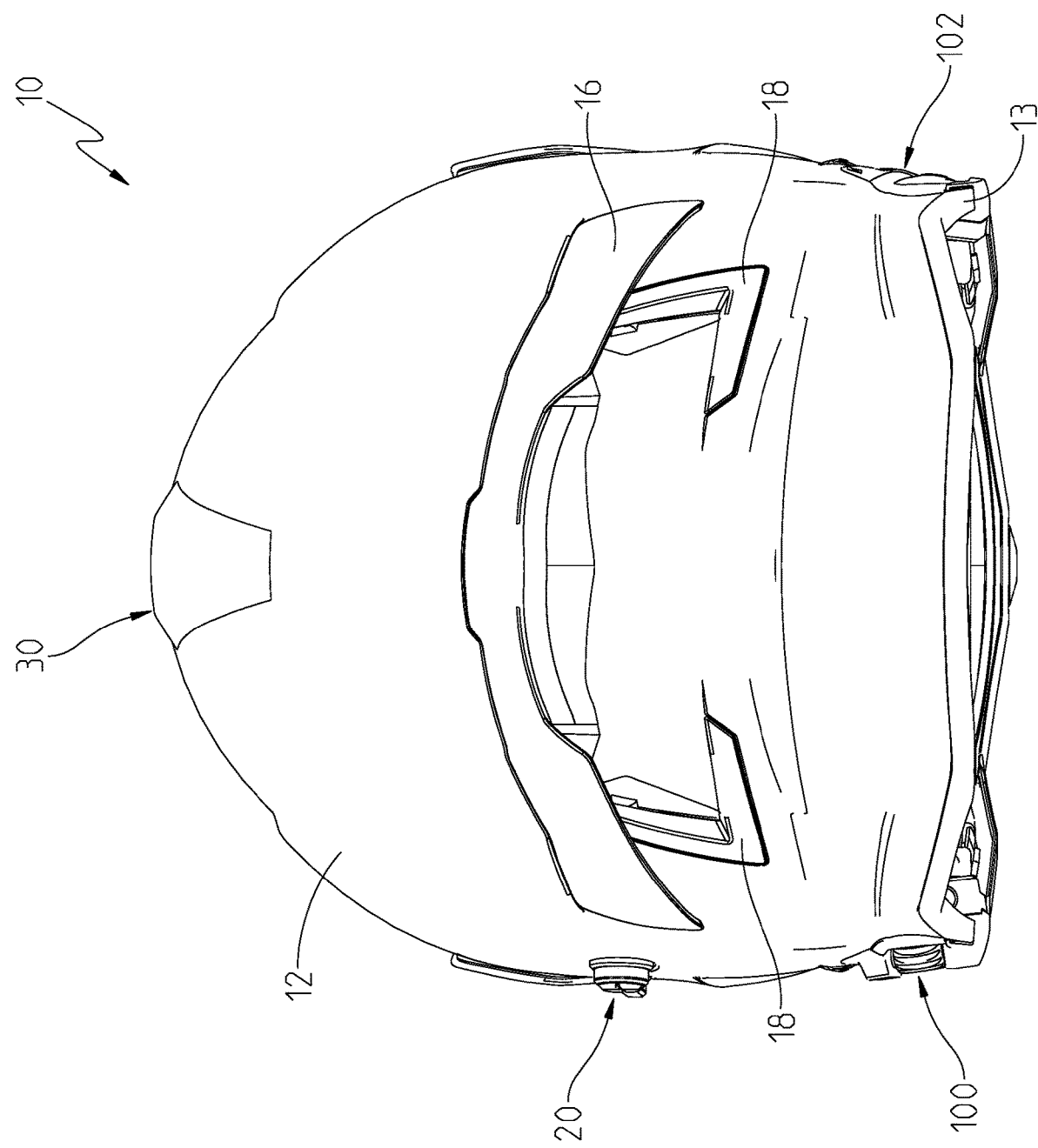
FIG. 4 is a rear view of the helmet of FIG. 1.
Figure 5:
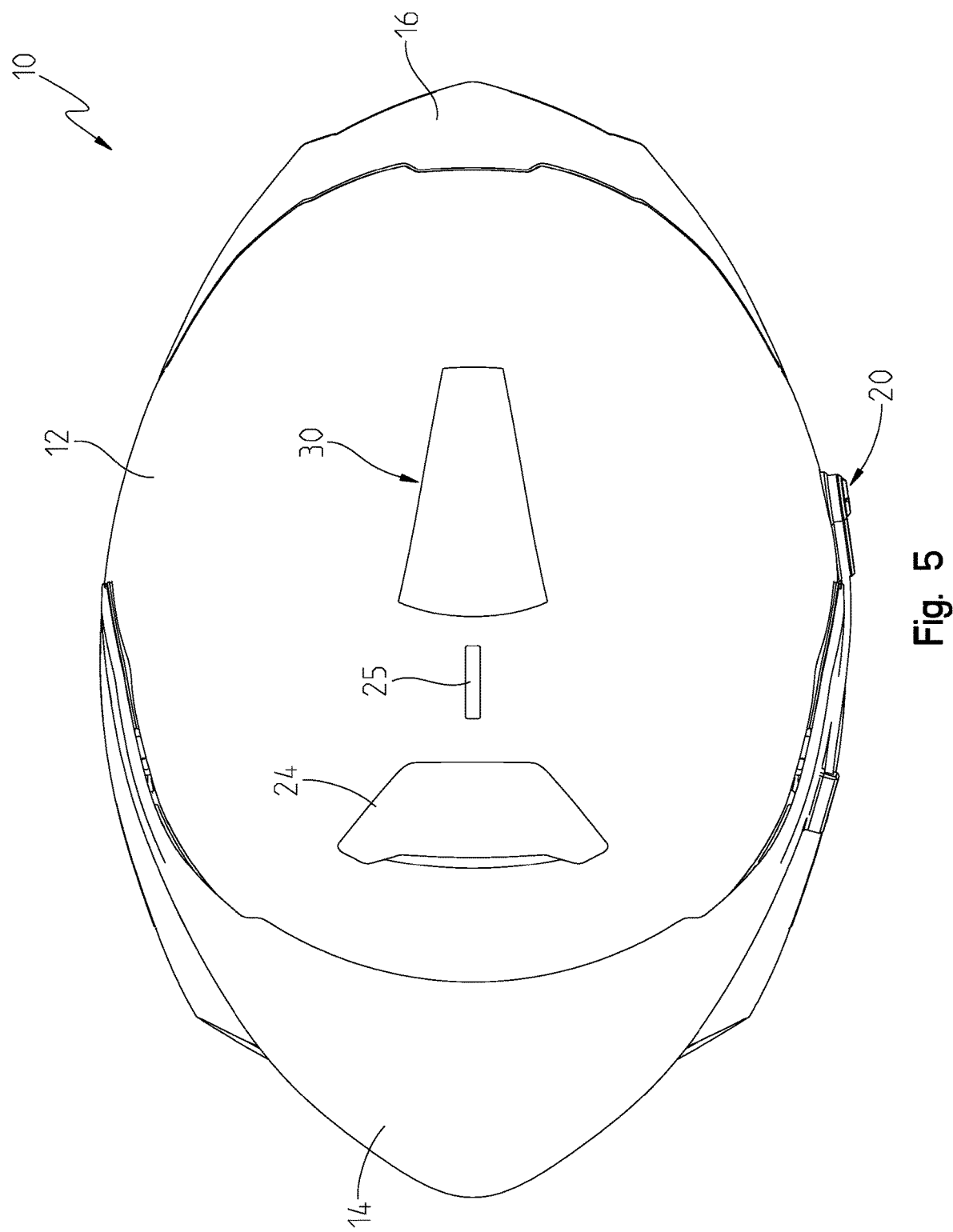
FIG. 5 is a top down view of the helmet of FIG. 1.

Referring to FIGS. 1, 2, and 4, helmet 10 may additionally comprise a plurality of lights 18 positioned on the shell 12. Illustratively, lights 18 may be positioned on the rear portion of shell 12 of helmet 10, and may be a left light and a right light configured to act as turn signals and/or tail lights/brake lights. In various embodiments, helmet 10 may have lights 18 positioned in various locations including on top of helmet 10, on the front of helmet 10, or on either side of helmet 10. Additional details of an embodiment of helmet 10 may be found in U.S. Application No. 63/188,248, filed May 13, 2021 titled "SYSTEMS AND METHODS FOR SMART HELMET", the complete disclosure of which is incorporated herein. In embodiments, helmet 10 communicates with a vehicle associated with helmet 10 over network controller 70 to receive indications of when to illuminate or extinguish lights 18 for action as one or more of turn signals, brake indicators, and tail lights.

In the illustrated embodiment, helmet 10 further includes a power source 40 (FIG. 10) supported by the shell 12. In various embodiments, helmet 10 includes a battery (not shown) placed within shell 12 or positioned on shell 12. In various embodiments, power source 40 is located on helmet 10, or within helmet 10, or within shell 12. In various embodiments, power source 40 is an external power source not integrated with helmet 10, wherein the external power source may be a vehicle, a battery pack, or other power source. Power source 40 is coupled to the controller 50 and provides power to at least the portions of the helmet 10 including visor 14, lights 18, radio 66, a left pod 100, a right pod 102, an accessory mounting portion 30, heating element 91, and biometric sensors 60. Illustratively, power plug 20 couples shell 12 and visor 14 to provide power from shell 12 to visor 14.

In the illustrated embodiment, network controller 70 is coupled to a network 71 which allows controller 50 to send information to network 71 and receive information from network 71. In various embodiments, network 71 is an external server, a mesh network, a vehicle to vehicle network, or the like. In various embodiments, controller may communicate to a cellular network through a mobile device 4 (see FIG. 12) or a cellular modem. Additionally, wireless controller 68 allows controller 50 to communicate over a wireless protocol (e.g. Wi-fi or Bluetooth, such as BLTE) to transfer information between helmet 10 and various other components (e.g. a vehicle, a display, a mobile device, another helmet, etc.).

Still referring to FIGS. 1-8, shell 12 further includes a lower edge 13 defining a bottom of shell 12. In various embodiments, lower edge 13 extends all the way around helmet 10. In various embodiments, helmet 10 may not be a full face helmet, and may only have a lower edge 13 extending around a portion of helmet 10. Illustratively, lower edge 13 may comprise a rubber cover or edge protector. Further, shell 12 includes a left side opening 101 and a right side opening 103 positioned along lower edge 13. Left side opening 101 receives left pod 100 and right side opening 103 receives right pod 102.

Further, helmet 10 may include an air scoop 24 positioned on an upper portion of shell 12, configured to provide ram air to the interior of helmet 10. Air scoop 24 may have a gate or other barrier (not shown) which may be selectively engaged by actuation of slider 25. When the gate or other barrier is not engaged, air may be allowed to flow into helmet 10 to create air flow for the wearer of helmet 10. In various embodiments, a neck seal (not shown) may be constructed around the lower edge 13 creating a sealed environment within helmet 10. Ram air flowing through air scoop 24 creates a positive pressure environment within helmet 10 to further prevent dust and other contaminants from entering into helmet 10. In various embodiments, an air filter is present between the air scoop 24 and the interior of helmet 10 to filter air passing into the interior of helmet 10. When slider 25 is engaged to close the gate or other barrier, air scoop 24 is closed and air will not flow into helmet 10 through air scoop 24.

In the illustrated embodiment, helmet 10 is configured to be worn by an operator or a passenger of a vehicle 2 (see FIG. 12) such as a recreational vehicle or a utility vehicle, including a side-by-side vehicle, a motorcycle, a snowmobile, an all-terrain vehicle, an off-road vehicle, and a three-wheel vehicle, however, various uses of helmet 10 are contemplated and this list should not be limiting in scope. In various embodiments, vehicle 2 includes a plurality of vehicle subsystems including a steering system (e.g. steering wheel, handlebars, or other), a suspension system, a propulsion system (e.g. internal combustion engine, electric powertrain, etc.), a user interface, a display, an audio system, a fuel system, a seat belt system, a safety system, an electrical system, and other subsystems. Vehicle 2 further includes an operator area comprising at least a driver's seat or standing area for an operator. Vehicle 2 may comprise a roll cage surrounding the operator area and may further comprise a passenger seat laterally next to the driver's seat, and/or may further comprise a passenger seat longitudinally rearward of the driver's seat. Exemplary vehicles and associated subsystems are found within U.S. Pat. No. 10,300,786, issued May 28, 2019 titled UTILITY VEHICLE; U.S. Pat. No. 10,315,719, issued Jun. 11, 2019, titled TWO-WHEELED VEHICLE; U.S. Pat. No. 9,004,214, issued Apr. 14, 2015, titled THREE WHEELED VEHICLE; U.S. Pat. No. 9,096,289, issued Aug. 4, 2015, titled SNOWMOBILE; U.S. Pat. No. 10,569,819, titled ALL-TERRAIN VEHICLE; U.S. Pat. No. 8,973,693, issued Mar. 10, 2015, titled SIDE-BY-SIDE ALL TERRAIN VEHICLE; U.S. Pat. No. 11,110,913, issued Sep. 7, 2021, titled VEHICLE HAVING ADJUST- ABLE SUSPENSION; U.S. Pat. No. 10,987,987, issued Apr. 27, 2021, titled VEHICLE HAVING ADJUSTABLE COMPRESSION AND REBOUND DAMPING; U.S. application Ser. No. 17/379,675, filed Jul. 19, 2021, titled ADJUSTABLE SUSPENSIONS AND VEHICLE OPERATION FOR OFF-ROAD RECREATIONAL VEHICLES; U.S. application Ser. No. 17/525,175, filed Nov. 12, 2021, titled UTILITY VEHICLE," the entirety of these disclosures of which are expressly incorporated herein by reference.

Figure 9:
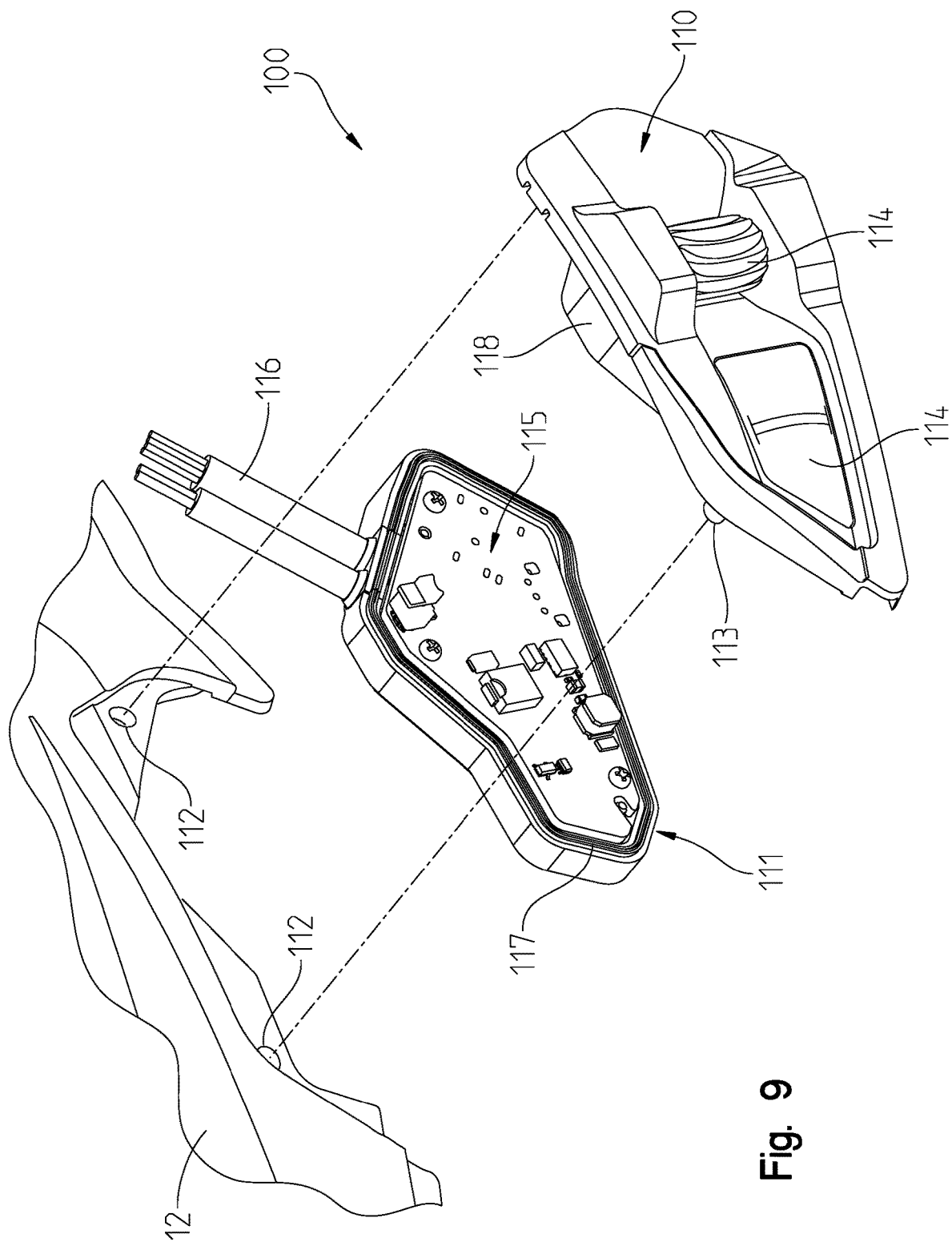
FIG. 9 is an exploded view of a module of the helmet of FIG. 1.

Now referring to FIG. 9, left pod 100 and right pod 102 each comprise a faceplate 110 and a body 111. Illustratively, a seal 117 is positioned around the perimeter of body 111 and configured to receive an extrusion on faceplate 110 to sealingly couple faceplate 110 to body 111. In this way, water and other contaminants may not enter between faceplate 110 and body 111. In the illustrated embodiment, a circuit board 115 is positioned within body 111, and is covered when faceplate 110 is positioned on body 111. Further, faceplate 110 includes a plurality of protrusions 113 and shell 12 includes a plurality of apertures 112. In the illustrated embodiment, protrusions 113 align with apertures 112. A plurality of fasteners (not shown) may be inserted from within shell 12 and into protrusions 113 to couple left pod 100 to shell 12. While FIG. 9 only displays left pod 100, right pod 102 is constructed in a similar manner.

Still referring to FIG. 9, a plurality of electrical wires 116 are coupled to body 111 and are configured to extend within helmet 10. Electrical wires 116 are configured to couple circuit board 115 to controller 50. In various embodiments, a plurality of input devices 114 may be positioned on faceplate 110 configured to provide input signals to controller 50. Input devices 114 may be a rotary input device, a press-button, a slider, a switch, or other type of input device. In various embodiments, input devices 114 may be used to adjust a volume of speakers 22, tune the frequency or power of radio 66, answer a call from a mobile device 4, control an accessory 75, or complete other actions as will be discussed below.

In the illustrated embodiment, left pod 100 and right pod 102 are configurable with varying capabilities. For example, left pod 100 and/or right pod 102 may comprise a radio 66 and a global positioning system (GPS) 52. In various embodiments, left pod 100 and/or right pod 102 may comprise any combination of components. In various embodiments, left pod 100 may comprise no components and may be a blank panel providing no additional capabilities. In various embodiments either left pod 100 or right pod 102 may comprise some or no components. In this way, helmet 10 may be made available with varying capabilities by varying the components of either left pod 100 or right pod 102. When either left pod 100 or right pod 102 does not comprise any electrical components, faceplate 110 may not comprise any inputs 114 and may be flat, contoured, or otherwise blank, and provide a consistent aesthetic across shell 12.

In various embodiments, left pod 100 and/or right pod 102 may comprise a Bluetooth radio configured to communicate with vehicle 2, mobile device 4, or another helmet 10 or a secondary device 11. In various embodiments, left pod 100 and/or right pod 102 may comprise an accelerometer 54, a gyroscope 56, or an IMU 58 configured to measure acceleration or roll rates. In this way, left pod 100 or right pod 102 may detect a safety related event. In various embodiments, left pod 100 or right pod 102 may be configured to detect a rate of acceleration, a rate of roll angle change, or any other rate of changing position. Additional details regarding the detection of safety related events may be found in U.S. application Ser. No. 17/506,204, filed Oct. 20, 2021, titled SYSTEMS AND METHODS FOR VEHICLE HAZARDOUS CONDITION DETECTION, the entire disclosure of which is expressly incorporated herein by reference.

Figure 10:
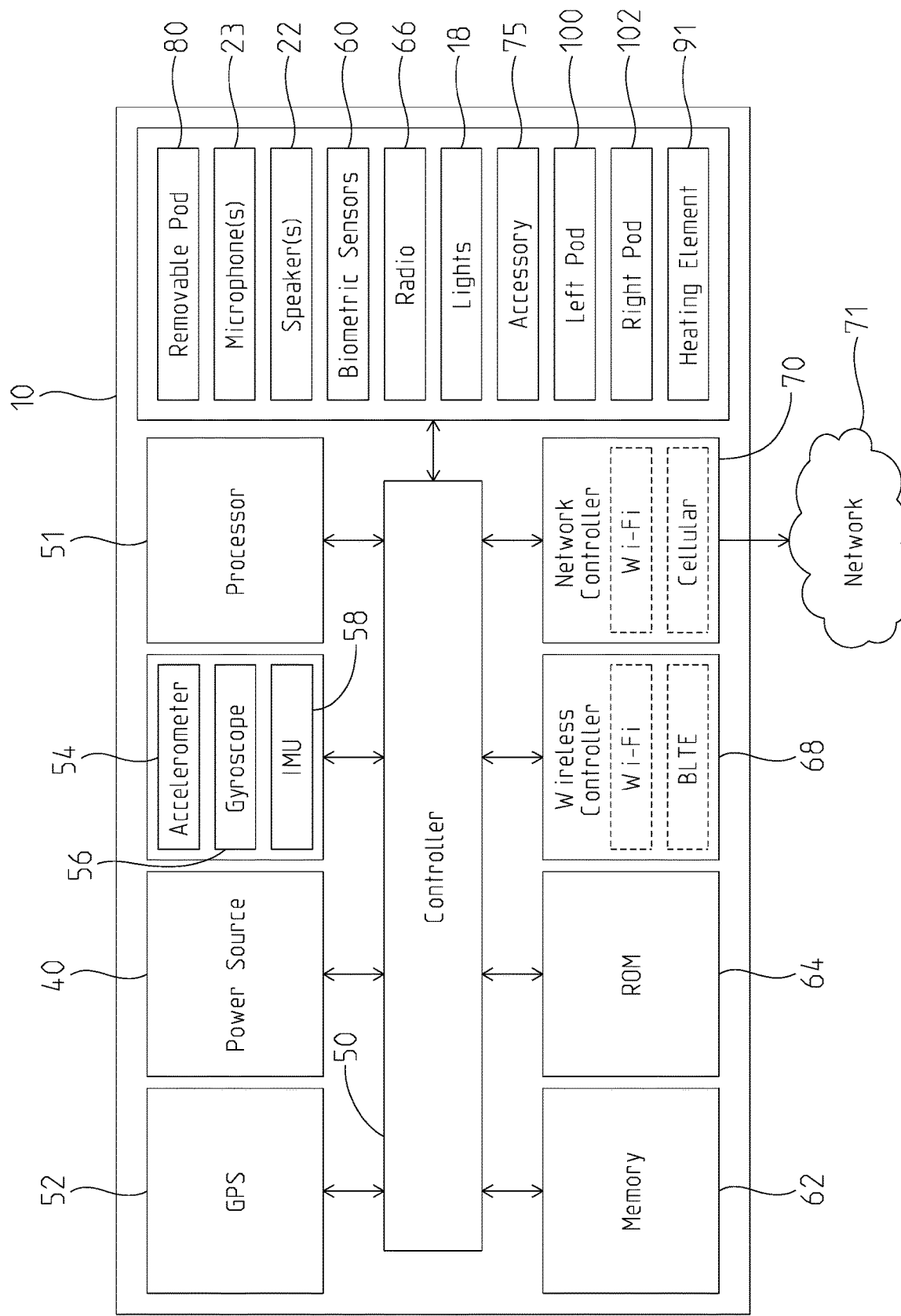
FIG. 10 is a block diagram of a first example computing system of the helmet of the present disclosure.

Referring now to FIG. 10, a configuration of helmet 10 is illustrated. Illustratively, a power source 40 provides power to helmet 10, and is operably coupled to controller 50. In the illustrated embodiment, helmet 10 further includes processor 51, GPS 52, accelerometer 54, gyroscope 56, inertial measurement unit (IMU) 58, memory 62, and ROM 64. Further, controller 50 is coupled to wireless controller 68, which is configured to communicate using a wireless protocol such as Wi-fi or BLTE. Additionally, controller 50 is coupled to a network controller 70 configured to communicate with a network 71 using a wi-fi protocol, a cellular protocol, or other type of wireless protocol.

In various embodiments, controller 50 is configured to couple with a plurality of sensors and components. Illustratively, controller 50 is coupled to a removable pod 80, microphone 23, speaker 22, biometric sensors 60, radio 66, lights 18, accessory 75, left pod 100, a right pod 102, and/or heating element 91.

Figure 11:
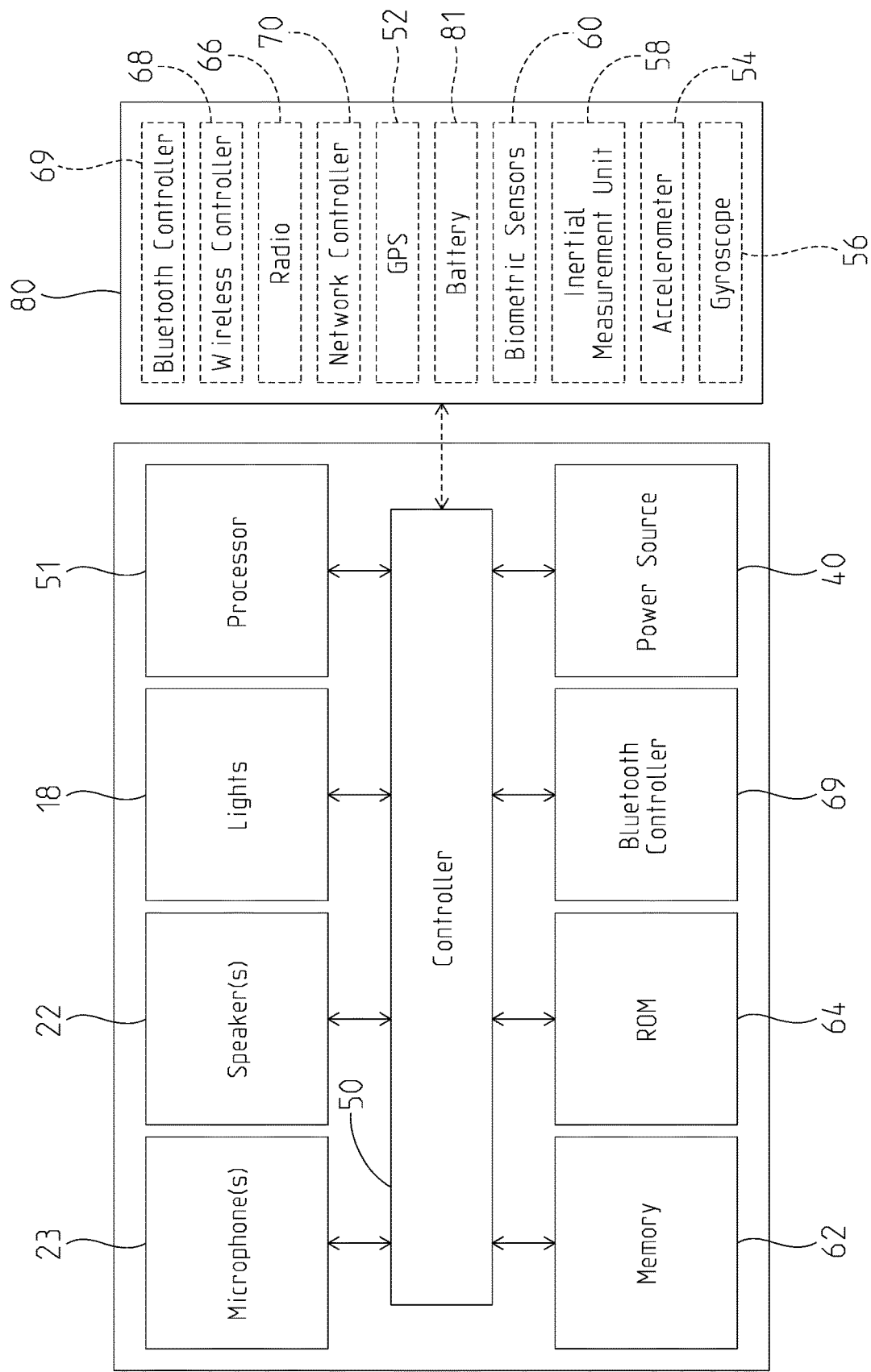
FIG. 11 is a block diagram of a second example computing system of the helmet of the present disclosure.

Referring now to FIG. 11, another embodiment of helmet 10 is illustrated. Illustratively, helmet 10 includes a controller 50 coupled to a microphone 23, a speaker 22, lights 18, processor 51, memory 62, ROM 64, power source 40, and a Bluetooth controller 69. In various embodiments, helmet 10 may further be coupled to a removable pod 80, which will be described in greater detail herein.

Modular Electronics

In various embodiments, helmet 10 includes removable pod 80, which is configured to be removably coupled to a secondary device 11 which may be another wearable item. In various embodiments, secondary device 11 may be another helmet 10, such as an embodiment of helmet 10 with minimal functionality. Removable pod 80 may have a variety of functions and components, including long range communication, radio, crash detection, safety features, geofence features, or others. In various embodiments, helmet 10 may comprise a plurality of removable pods 80, wherein each removable pod 80 has a distinct function. In the illustrated embodiment, removable pod 80 couples to an outside of shell 12. In various embodiments, removable pod 80 couples to an inside of shell 12. Removable pod 80 is configured to improve and introduce new capabilities of the device it is coupled to.

Referring to FIG. 11, removable pod 80 includes a battery 81 and a Bluetooth controller 69 which may be used to communicate information to controller 50. Illustratively, removable pod 80 may also comprise a wireless controller 68 configured to communicate over longer distances than the Bluetooth controller 69. Additionally, a network controller 70 may be positioned within removable pod 80 to give helmet 10 access to a network 71. In various embodiments, removable pod 80 may also comprise GPS 52, radio 66, accelerometer 54, gyroscope 56, IMU 58, and biometric sensors 60.

Figure 12:
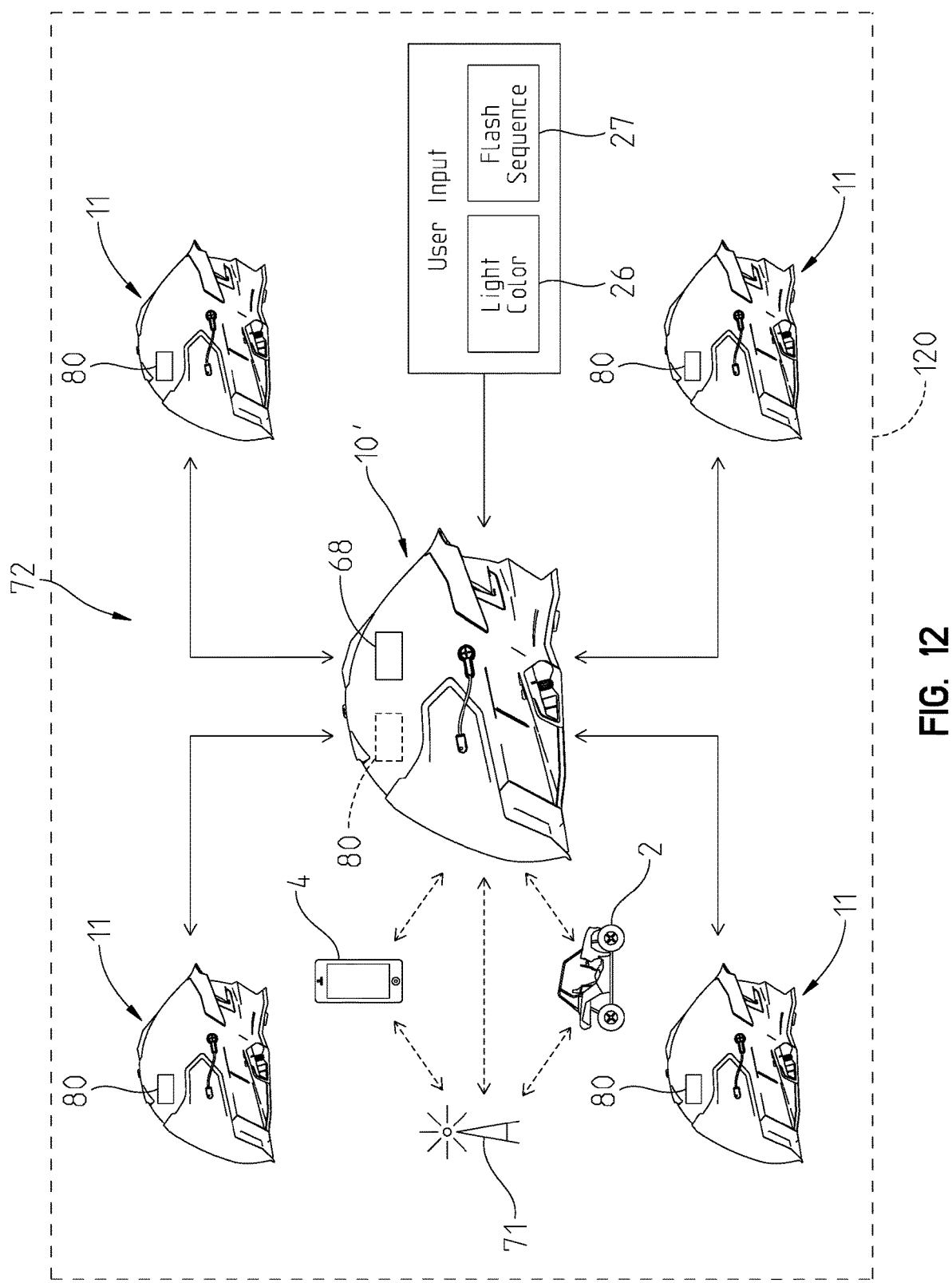
FIG. 12 is a network diagram showing an example network configuration of the helmet of the present disclosure.

In the illustrated embodiment, referring to FIG. 12, secondary device 11 may be configured to communicate with helmet 10 and/or other secondary devices 11 using removable pod 80. Illustratively, helmet 10 is communicably coupled with secondary devices 11 through a wireless connection protocol (e.g. Wi-Fi or BLTE or any other suitable wireless protocol) Helmet 10 and secondary devices 11 may communicate through wireless controller 68. For example, wireless controller 68 of helmet 10 may communicate over BLTE with Bluetooth controller 69 of secondary device 11.

Alternatively, wireless controller 68 may communicate over a Wi-Fi protocol if secondary device 11 includes a wireless controller 68 with Wi-Fi capability. In various embodiments, helmet 10 may comprise removable pod 80 with a Bluetooth controller 69 configured to provide communication capability between helmet 10 and secondary device 11 through the use of Bluetooth controller 69. Removable pod 80 may be coupled to an outer portion or an inner portion of helmet 10 and/or secondary device 11. In various embodiments, helmet 10 may be considered a primary helmet, or master helmet 10'. Additionally, secondary devices 11 may operate based upon instructions from helmet 10. In this way, a network, or a first group 120, of helmets 10, 11, may be created wherein the primary helmet 10' is configured to provide instructions to the secondary devices 11. In various embodiments, master helmet 10' may be selected by a user of helmet 10', a member of first group 120, or a network 71.

In the illustrated embodiment, secondary devices 11 may be configured to connect only to the master helmet 10', such that secondary devices 11 may only couple with an authorized helmet. Further, a plurality of removable pods 80 and wireless controllers 68 on helmets 10, 10' and secondary devices 11 may create a mesh network 72 so that all devices 10, 10', 11 with removable pods 80 or wireless controllers 68 may communicate with each other. In various embodiments, removable pods 80 and wireless controllers 68 may create a secure network which requires a key, a user passcode, a biometric scan, or other form of authentication to join. In this way, secure groups may be created which allow communication within the group. An exemplary form of creating and using groups may be found in U.S. Pat. No. 10,038,977, issued Jul. 31, 2018, titled "RECREATIONAL VEHICLE GROUP MANAGEMENT SYSTEM, the entire disclosure of which is enclosed herein by reference.

Figure 13:
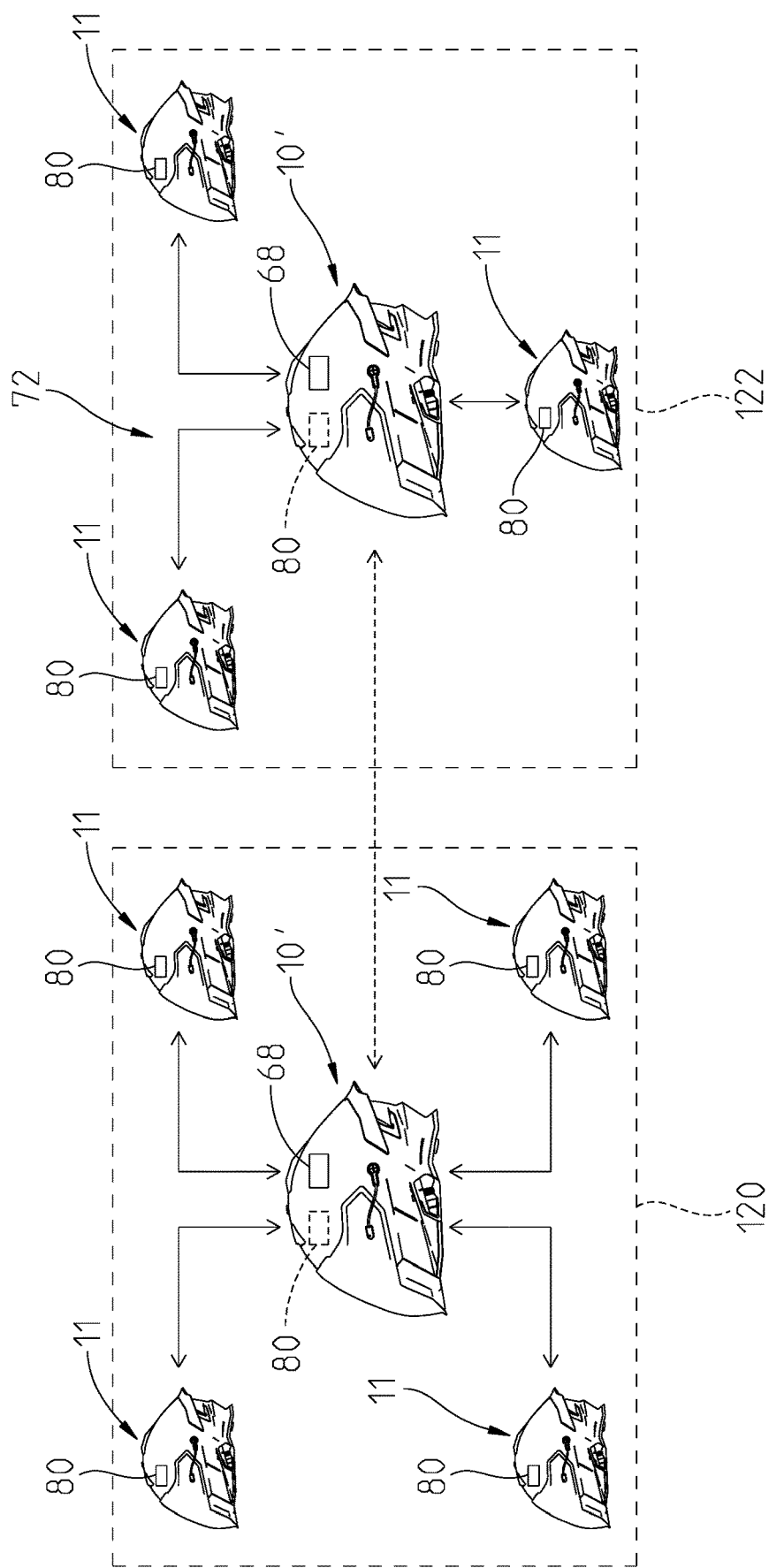
FIG. 13 is a network diagram showing an example group network configuration of the helmet of the present disclosure.

Referring now to FIG. 13, helmet 10' may comprise both removable pod 80 and wireless controller 68. In an embodiment, helmet 10' may communicate with secondary devices 11 using removable pod 80 or wireless controller 68 creating a first group 120. Additionally, helmet 10' may communicate with an additional helmet 10' which is communicating with additional secondary devices 11 within a second group 122. In the illustrated embodiment, wireless controller 68 may comprise longer range communication capabilities than removable pod 80 allowing for the first group 120 and the second group 122 to be spaced further apart than the helmet 10 and secondary devices 11 within either the first group 120 or second group 122. In various embodiments, helmet 10' of first group 120 may connect to helmet 10' of second group 122 and may further connect to additional groups (not shown) creating several paths of communication between a plurality of groups. In various embodiments, a secondary device 11 within first group 120 may communicate with a secondary device 11 within the second group 122. Secondary device 11 may transmit communication to helmet 10', which may then act as a relay to helmet 10' of second group 122 and transmit the communication to the secondary device 11 of second group 122.

Chase Light

Referring to FIGS. 12-13, first group 120 and/or second group 122 may be used to create a common lighting scheme among group members. Light 18 of helmet 10 may be a Light Emitting Diode (LED) capable of emitting various lighting characteristics, such as a light color 26, and a flash sequence 27. Lights 18 may be capable of emitting various light colors 26, such as white, black, red, orange, yellow, green, blue, purple, or a variety of colors in sequence. Further, lights 18 may emit light in a flash sequence 27, such as on/off, on/on/off, on/off/off, or any other suitable pattern. In the illustrated embodiment, first group 120 may communicate a common light characteristic between all helmets and devices 10, 10', 11 within first group 120 over mesh network 72. In an embodiment, the primary helmet 10' within a group instructs each secondary device 11 to display a certain light characteristic. For example, primary helmet 10' may instruct each secondary device 11 to display the color yellow in a repeated on/off sequence.

In the illustrated embodiment, primary helmet 10' receives a user input 28 indicating a desired lighting characteristic 26, 27 for the first group 120. User input 28 may come from a mobile device, a vehicle display, an input signal from input devices 114, or other inputs. Primary helmet 10' provides instructions through wireless communication (e.g. Wi-Fi or BLTE) to secondary devices 11 as previously described.

In various embodiments, helmet 10' of the first group 120 may communicate a lighting characteristic with helmet 10' of the second group 122. Helmet 10' of the second group 122 may instruct each device 10, 11 within second group 122 to not display the same lighting characteristics as first group 120 based upon the communicated lighting characteristic of the first group 120. In this way, when first group 120 and second group 122 are located in proximity with each other, each group 120, 122 has a distinct lighting characteristic 26, 27.

In various embodiments, within first group 120, at least one of helmet 10 and the secondary devices 11 may display one similar lighting characteristic and one different lighting characteristic as the remaining devices within first group 120. In this way, riders may distinguish between a leader in the group and other riders in the group. (e.g. all device display green lights, helmet 10' displays a on/off flash sequence, all secondary devices 11 display no flash sequence.) In various embodiments, any device 10', 10, 11 within first group 120 may determine the lighting characteristics 26, 27 for first group 120.

In the illustrated embodiment, all devices 10', 10, 11 within first group 120 are synchronized across mesh network 72 which allows for each device 10, 11 to display the appropriate lighting characteristic 26, 27 at the same frequency. The mesh network 72 may operate on a variety of frequencies. In the illustrated embodiment, the mesh network 72 operates at 2.4 GigaHertz (GHz).

Smart Tether

Figure 14:
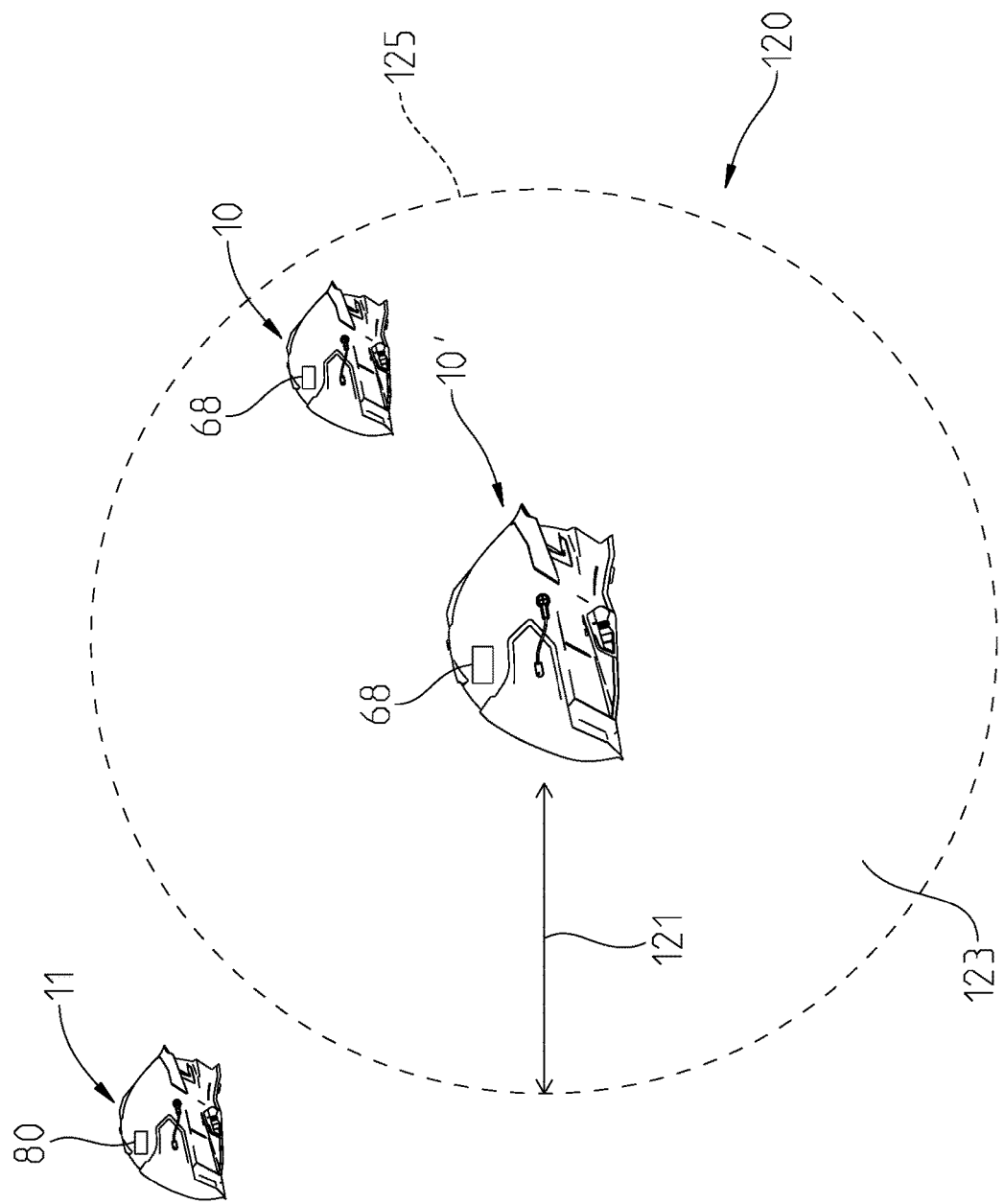
FIG. 14 is a diagram showing an example group of the helmet of the present disclosure.

Helmet 10 may further be used as a tether device within first group 120. Referring to FIG. 14, first group 120 may comprise a plurality of helmets 10 or secondary devices 11, wherein a first helmet 10 is designated as a master helmet 10'. The master helmet may be designated by selecting the master helmet from a list of all helmets 10 and secondary devices 11 within a mobile application, a computer application, or a display of vehicle 2. Master helmet 10' acts as a center point for first group 120 and a first distance 121 is created extending radially outward from the position of master helmet 10', creating a bounded area 123 with a boundary 125. First distance 121 may be set by a user of helmet 10', a network administrator, a user of a connected mobile application, an operator of vehicle 2, or a parent or other authorized controlling figure. In the illustrated embodiment, all helmets 10 and secondary devices 11 of first group 120 are configured to remain inside bounded area 123. Helmets 10 and secondary devices 11 are configured to detect their position relative to master helmet 10' and detect if they are positioned further away than first distance 121. In various embodiments, all devices 10', 10, 11 detect their position using GPS 52. If helmet 10 or secondary device 11 detects that they are further away from master helmet 10' than first distance 121, the helmet 10 or secondary device 11 may provide a warning or notification. In the illustrated embodiment, the warning or notification may be an audible noise to the user of any or all of master helmet 10', helmet 10 or secondary device 11. The warning or notification may be a visible display on a display of any of vehicles 2 within first group 120.

In the illustrated embodiment, helmet 10 or secondary device 11 determine their relative position to master helmet 10' by measuring the strength of a radio frequency between helmet 10 or secondary device 11 and master helmet 10'. A higher strength of a radio frequency between the devices indicates that they are closer together. A lower strength of a radio frequency between the devices indicates that they are further apart. In various embodiments, the bounded area 123 and boundary 125 may be determined as a function of frequency signal strength. In various embodiments, the boundary 125 may be set a first distance 121 equal to 50% of a maximum frequency signal strength. In various embodiments, the boundary 125 may be set at a first distance equal to 10%, 20%, 25%, 30%, 40%, 60%, 70%, 75%, 80, or 90% of maximum frequency signal strength. In various embodiments, first distance 121 is dynamic, and as objects in the area of devices 10', 10, 11 weaken the signal strength, the first distance 121 shrinks with it. In this way, the bounded area 123 of first group 120 is dynamic, and the position of bounded area 123 and boundary 125 are changing as the position of master helmet 10' changes.

Helmet 10 or secondary device 11 may be configured to provide notifications as the device approaches boundary 125. In various embodiments, as helmet 10 or secondary device 11 approaches boundary 125, a vehicle 2 associated with helmet 10 or secondary device 11 may be derated or have a vehicle characteristic altered. In various embodiments, a vehicle characteristic of a vehicle 2 associated with either helmet 10 or secondary device 11 may be altered in response to a determined frequency signal strength. The vehicle is associated with the helmet through one of a wired or wireless network and a controller of the vehicle receives inputs from the controller of helmet 10 which are used in determining when to one of derate the vehicle or alter a vehicle characteristic.

Auto Radio Gain Adjustment

Helmet 10 includes a radio 66 configured to transmit and receive radio signals. In various embodiments, helmet 10 includes both a radio receiver and a radio transmitter. In the embodiments, a transceiver is used to both transmit and receive radio signals. Helmet 10 may be utilized in various geographical locations which may have restrictions for a maximum power a radio may use to communicate. In the illustrated embodiment, radio 66 has a current power, or amplitude 131 used by the radio 66. Further, radio 66 is configured to have a variable maximum power so that radio 66 can adjust the current power 131 based upon the geographical location of helmet 10.

Figure 15:
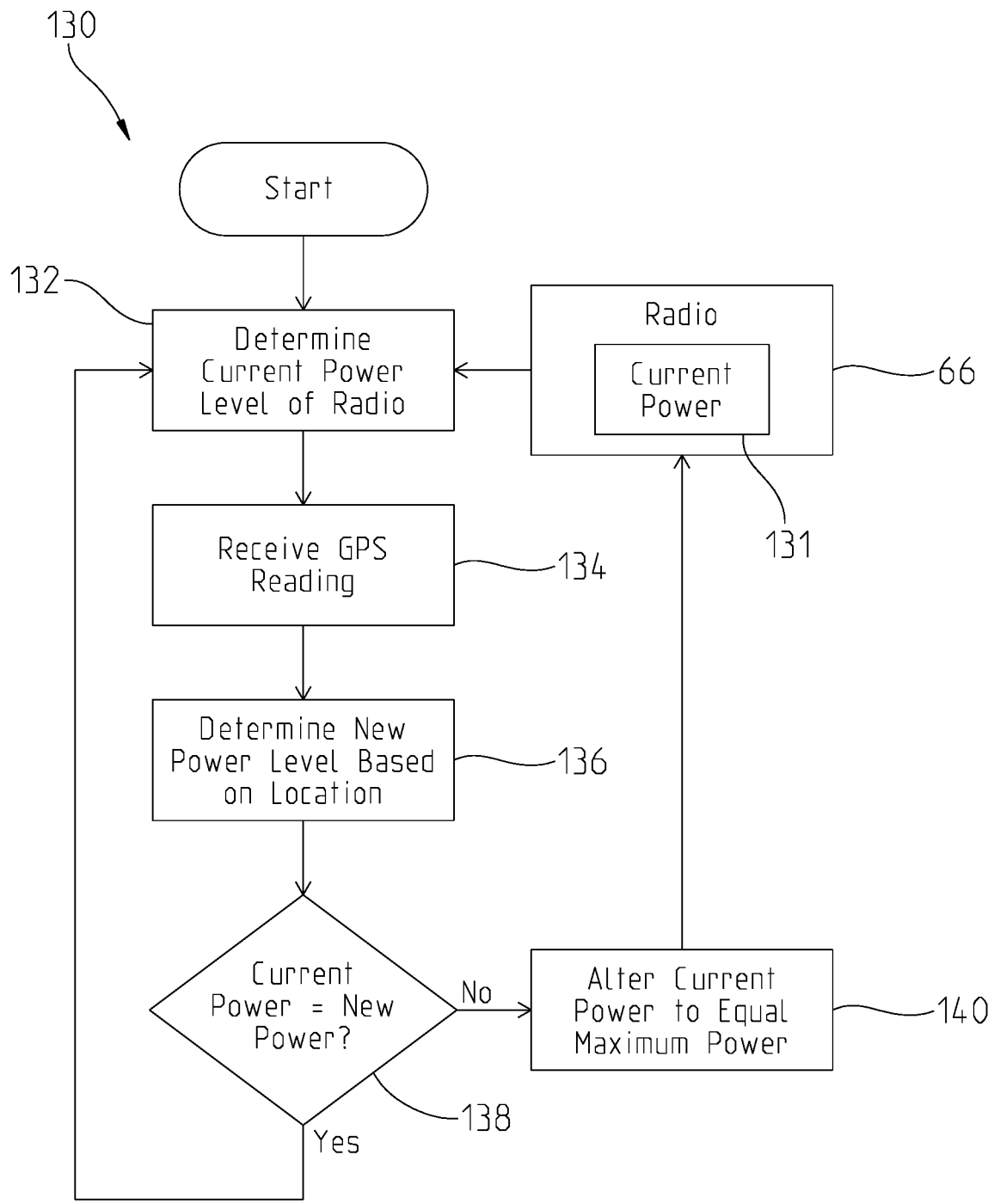
FIG. 15 is a processing sequence of setting a radio power of the present disclosure.

In the illustrated embodiment, it may be desired that radio 66 utilize a maximum power available based upon a geographical location. Referring to FIG. 15, a processing sequence 130 provides a method of maximizing the power used by radio 66. Processing sequence 130 may be executed by processor 51 within helmet 10, or in various embodiments, may be executed using any combination of network 71, a mobile device 4, a display of a vehicle 2, or other system capable of receiving, processing, and/or transmitting information. Illustratively, processing sequence 130 starts at block 132 and determines the current power 131 used by radio 66. Processing sequence 130 moves to block 134 and receives a GPS reading from any of helmet 10, mobile device 4, or vehicle 2. In the illustrated embodiment, mobile device 4 receives a GPS reading and determines a current location of helmet 10, and in block 136 a maximum power is determined based upon the regulations and restrictions of the current location. In various embodiments, mobile device 4 receives a maximum power from a network 71, a local list, or other source. Further, block 138 queries if the current power 131 used by radio 66 is equal to the maximum power determined in block 136. If the current power 131 is equal to the maximum power allowed, no action is taken, and process 130 returns to block 132. If the current power 131 is not equal to the maximum power allowed, block 138 moves to block 140 and the current power 131 used by radio 66 is altered to equal the maximum power allowed based upon the current location of helmet 10. This new power equal to the power frequency allowed is then pushed to radio 66.

In various embodiments, mobile device 4 completes processing sequence 130 through a mobile application such as the Ride Command® Application offered by Polaris Industries. The mobile application may continually run processing sequence 130, and when block 138 determines that a maximum power allowed does not match the current power used by radio 66, the mobile device 4 may push the maximum power allowed to the radio 66 of helmet 10. In various embodiments, mobile device 4 may be connected to more than one helmet 10 or secondary device 11 and may push the maximum power allowed to each helmet 10 or secondary device 11 it is connected to. In various embodiments, mobile device 4 may be connected to helmet 10 within first group 120. When mobile device 4 pushes a maximum power allowed to helmet 10, helmet 10 may push the maximum power allowed to all devices 10, 11 within first group 120.

In various embodiments, vehicle 2 may complete processing sequence 130 and push the maximum power allowed to each occupant with vehicle 2. Alternatively, vehicle 2 may be in first group 120 with additional vehicles 2, helmets 10, and secondary devices 11. Vehicle 2 may push the maximum power to each vehicle 2, helmet 10, and secondary device 11 within the first group 120 so that each device within the first group operates at the maximum power allowed.

In various embodiments, processing sequence 130 may determine the maximum allowable power allowed based upon the geographic location of helmet 10 and determine if the current power 131 is less than the maximum allowable power. If the current power is less than the maximum allowable power, the maximum allowable power may be pushed to radio 66. Radio 66 may then operate at any power under the maximum allowable power.

Helmet Accessory Attachment Mount

Figure 16:
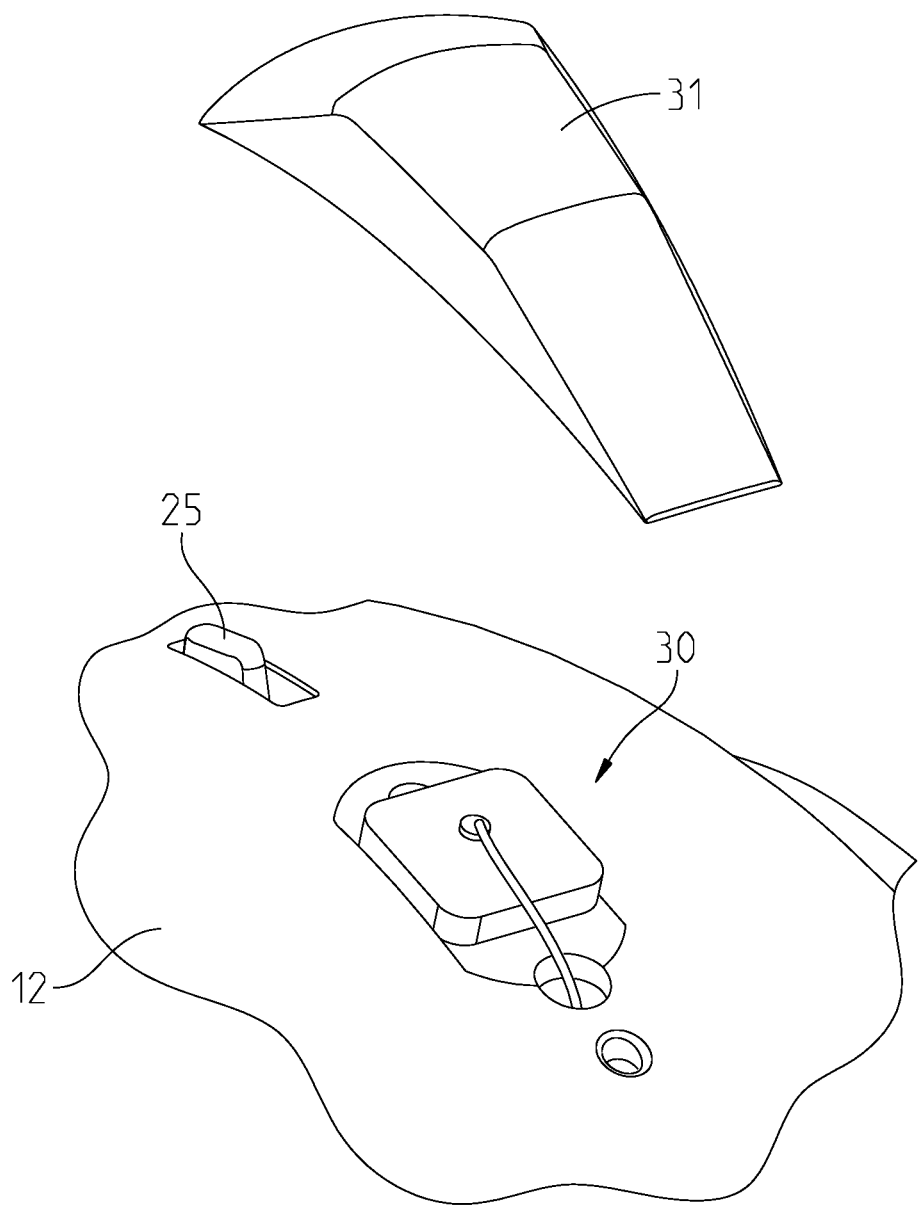
FIG. 16 is an exploded perspective view of an accessory attachment of the present disclosure.
Figure 17:
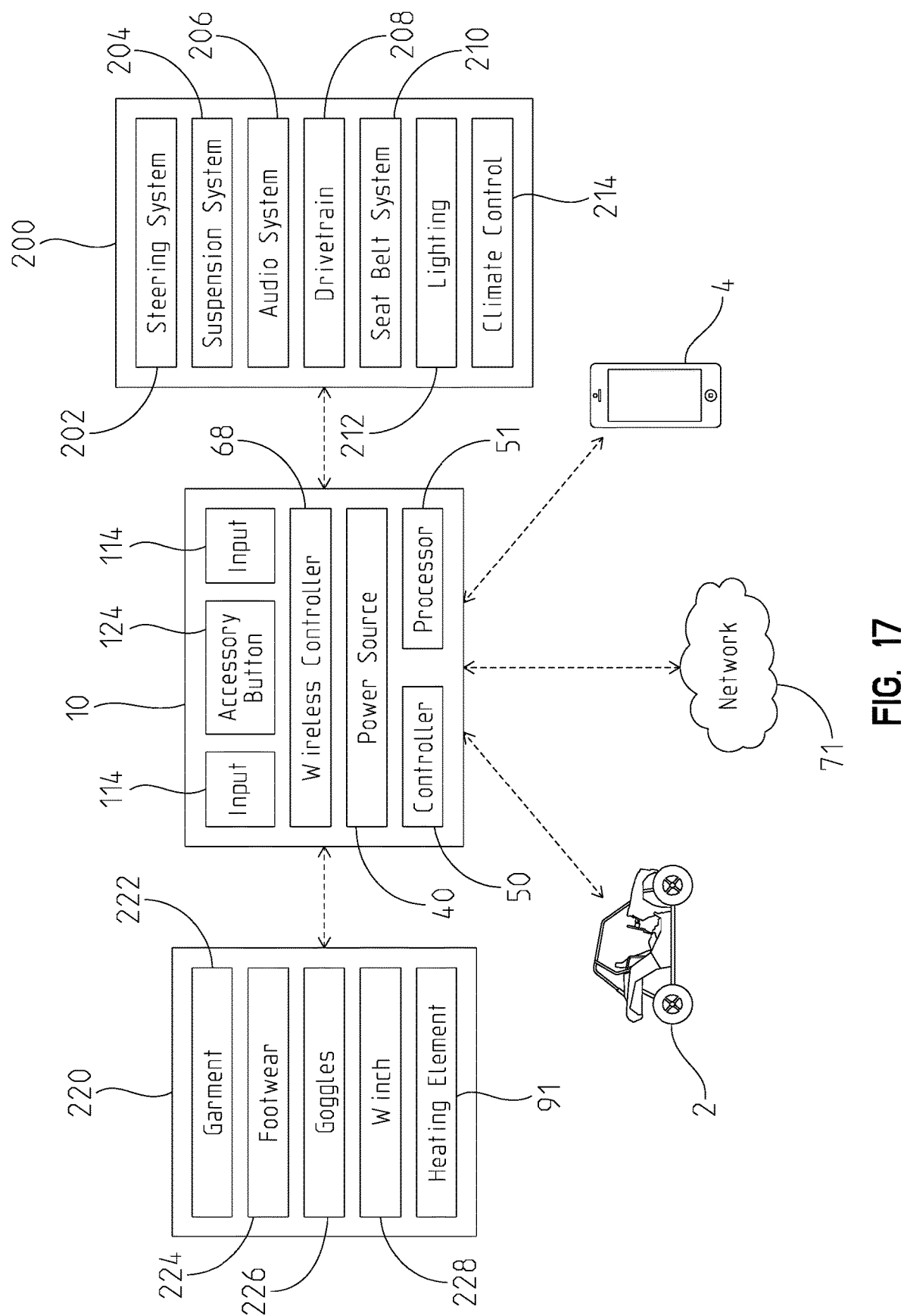
FIG. 17 is a diagram of an accessory control system of the present disclosure.

Helmet 10 may further comprise mounting locations for an accessory 75. Referring to FIG. 16, accessory 75 may be received at accessory mounting portion 30. Illustratively, accessory mounting portion 30 may be covered by a shield 31 when not in use, and uncovered by removing shield 31 when in use. In various embodiments, accessory mounting portion 30 may include an electrical connection (not shown). The electrical connection is coupled to the power source 40. Accessory mounting portion 30 is configured to couple with an accessory mount (not shown) or directly with an accessory, such as a flashlight, a camera, an antenna, a radio, or other type of accessory.

Referring again to FIGS. 1-9, another method of attaching accessories 75 will be explained. In the illustrated embodiment, left pod 100 and right pod 102 may be configured to receive accessory 75. In various embodiments, faceplate 110 may be blank, and configured without any inputs 114. Additionally, body 111 may further be removed from left pod 100 and right pod 102 to reduce weight, complexity, and cost. Alternatively, body 111 and faceplate 110 may be coupled, and circuit board 115 may be removed from within body 111. Further, faceplate 110 may be configured to receive accessory 75. In various embodiments, accessory 75 is a flashlight, yet in other embodiments, accessory 75 may be a camera, an antenna, a radio, a Bluetooth headset, a speaker, a microphone, a strobe light, an LED light, or other accessory. Left pod 100 or right pod 102 may be configured to receive accessory 75 by use of a fastener (not shown), a clasp, Velcro, adhesive, or other fastener.

In various embodiments, left pod 100 and right pod 102 may comprise interchangeable faceplates 110. Faceplate 110 may be removed and replaced with an accessory faceplate (not shown) which includes a connecting interface (not shown) for coupling an accessory 75 to the accessory faceplate. Connecting interface may comprise a mechanical connection, an electrical connection, or both a mechanical connection and an electrical connection. In various embodiments, connecting interface is completely integrated into left pod 100 or right pod 102. In various embodiments, connecting interface is coupled to left pod 100 or right pod 102 through permanent methods. In other embodiments, connecting interface is coupled to left pod 100 or right pod 102 through an adhesive or fastener. In various embodiments, left pod 100 and/or right pod 102 receives an electrical connection from power source 40 through electrical wires 116 and provides electricity to the connecting interface and accessory 75.

Connecting interface may connect accessory 75 to controller 50. In various embodiments, controller 50 may automatically detect the type of accessory 75 coupled to helmet 10. Controller 50 may then automatically provide specific instructions based upon the type of accessory 75. In an example, accessory 75 is an LED light, and controller 50 automatically detects the LED light and controls it synchronously with the lights 18. In another example, accessory 75 is a radio, and controller 50 detects the radio and operates it in conjunction with other radios 66 in the first group 120. Additional details about automatically detecting and utilizing accessories may be found in U.S. application Ser. No. 16/560,588, filed Sep. 4, 2019 titled MANAGING RECREATIONAL VEHICLES AND ACCESSORIES, the entire disclosure of which is expressly incorporated herein.

Smart Helmet External Accessory Control

Referring now to FIG. 16, input devices 114 may be configurable to control a variety of components or systems. In the illustrated embodiment, helmet 10 may be communicably coupled to a plurality of vehicle subsystems 200, and a plurality of auxiliary components 220. In the illustrated embodiment, a user input to any of input devices 114 may be configurable to control any of vehicle subsystems 200 and auxiliary components 220. Input devices 114 may be programmed using mobile device 4, vehicle 2, or a network 71 to select which vehicle subsystem 200 or auxiliary component 220 should be programmed to input device 114.

In various embodiments, helmet 10 includes input devices 114 and a designated accessory button 124. Accessory button 124 may be positioned on left pod 100 or right pod 102 or may further be positioned elsewhere on helmet 10. In various embodiments, input devices 114 may activate a communication protocol (e.g. radio) to provide communication across first group 120, and accessory button 124 may be configured to provide communication to a single other user, or a selected plurality of users. Alternatively, accessory button 124 may be configured to provide a communication to all users within a selected area. In various embodiments, input devices 114 have a standard function (e.g. radio communication), and accessory button 124 may be configurable to control any of vehicle subsystems 200 and auxiliary components 220.

In the illustrated embodiment, a user may utilize mobile device 4 to select one of input devices 114 or accessory button 124 for configuration. Further, a user may select and map input device 114 or accessory button 124 to control a controllable characteristic 230 of any of vehicle subsystems 200 or auxiliary components 220. In the illustrated embodiment, a user may use the Ride Command® application on a mobile device to pair to helmet 10 and input devices 114, 124. The user may select a menu for configuring the input devices 114 or button 124 and may then select from a list of all controllable characteristics 230 to map to input devices 114 or button 124.

In various embodiments, vehicle subsystem 200 may be a steering system 202, a suspension system 204, an audio system 206, a drivetrain 208, a seat belt system 210, a lighting system 212, or a climate control system 214. In various embodiments, each vehicle subsystem 200 includes at least one controllable characteristic 230. In various embodiments, the controllable characteristic 230 is an electronic power steering mode, which controls a torque output map of the electronic power steering module of steering system 202. In various embodiments, the controllable characteristic 230 is a damping characteristic (e.g. compression or rebound rate) of a shock absorber (not shown) of suspension system 204. In various embodiments, the controllable characteristic 230 is a volume control, radio tuning, audio selection, or phone control of audio system 206. In various embodiments, the controllable characteristic 230 is a drive mode of drivetrain 208 (e.g. rock mode, track mode, comfort mode, baja mode, or other). In various embodiments, the controllable characteristic 230 is a seat belt retractor mode of seat belt system 210. In various embodiments, the controllable characteristic 230 is a lighting mode of lighting system 212. In various embodiments, the controllable characteristic 230 is a seat warmer setting or an air condition setting of climate control system 214. In various embodiments, auxiliary component 220 may be a garment 222 warn by a user, a piece of footwear 224, a goggle 226, a winch 228, or heating element 91. In various embodiments, controllable characteristic 230 of garment 222 is a warming or cooling capability of a climate controlled jacket, climate controlled pants, climate controlled gloves, or other climate controlled wearable garment. In various embodiments, controllable characteristic 230 of footwear 224 is a warmer built into footwear 224 to keep feet of the user warm. In various embodiments, the controllable characteristic 230 of goggle 226 is the power provided to a heated lens, an anti-fog system, or heads up display. In various embodiments, the controllable characteristic 230 of winch 228 is an on/off command or a speed command. In various embodiments, the controllable characteristic 230 of heating element 91 is an on/off command.

Input device 114 may be a pressable button, in which a single press may be programmed to control a first controllable characteristic 230, and a double press may be programmed to control a second controllable characteristic 230. In various embodiments, a user may hold input device 114 in a pressed position to control yet a third controllable characteristic 230. In various embodiments, input device 114 may be a rotary type input, and an actuation of the rotary type input may change any controllable characteristics 230 which may cycle through a small number of discrete outputs (e.g. choosing a level of warmth for a heated garment) or may further cycle through a large range of output values (e.g. audio volume). In various embodiments, both left pod 100 and right pod 102 comprise separate input devices 114 and each input device 114 is configured to control a separate controllable characteristic 230.

Helmet 10 may automatically map input devices 114 to various controllable characteristics 230 based upon a location of helmet 10. Helmet 10 may be configured to detect its position relative to vehicle 2 and may determine when a user is not seated within vehicle 2. If helmet 10 detects a user is not seated within vehicle 2, helmet 10 may automatically map input device 114 to lighting system 212 so that a user may always turn on the lighting system 212 of vehicle 2 if they are not in vehicle 2. In various embodiments, helmet 10 may automatically map input device 114 to the winch system 228 so that a user can let out or retract a winch 228 when they are not seated in the vehicle 2.

Smart Helmet Breath Box Heating Element

Figure 8:
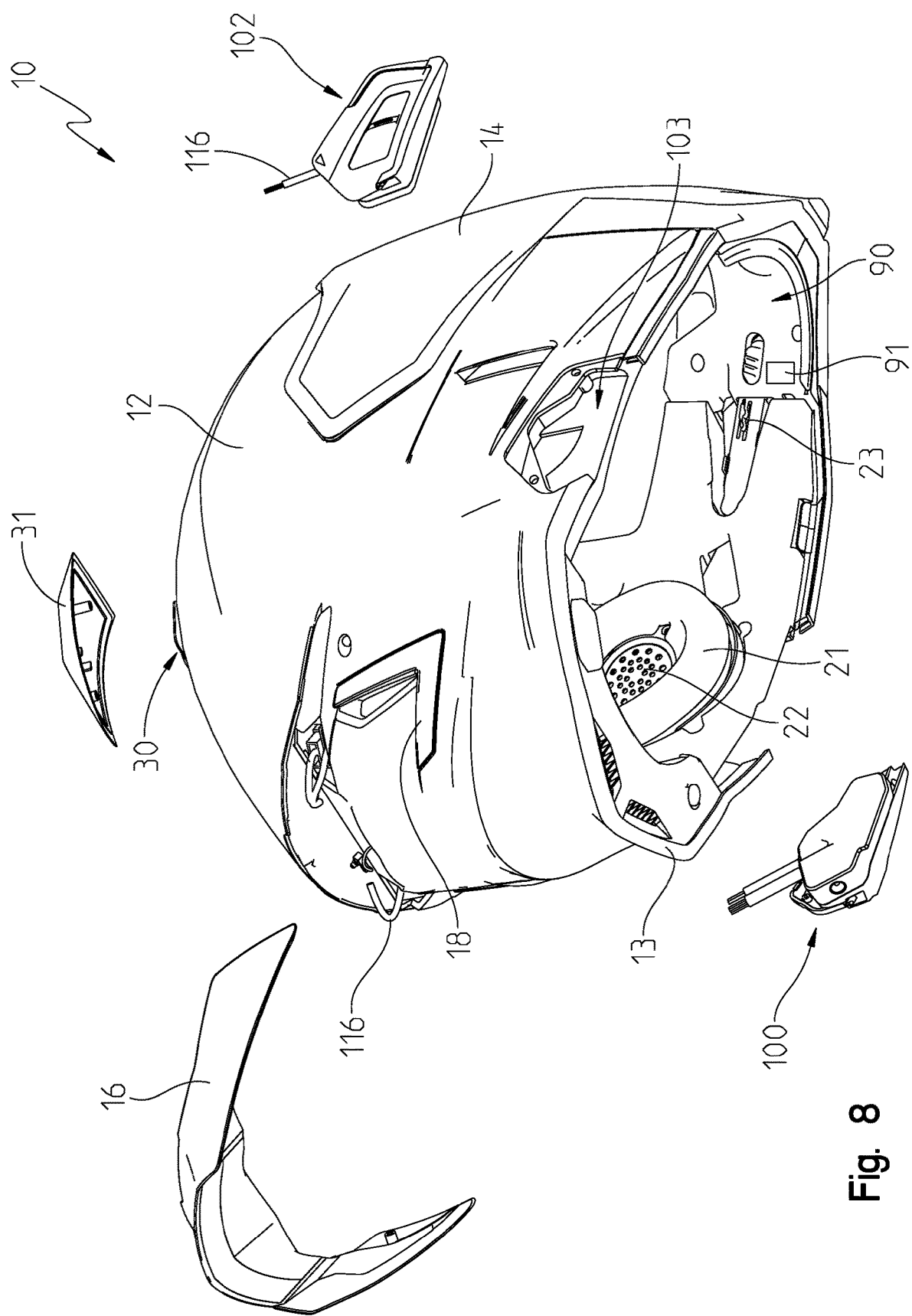
FIG. 8 is an exploded rear perspective view of the helmet of FIG. 1.

Referring to FIG. 8, helmet 10 includes a heating element 91 positioned within breathbox 90. In the illustrated embodiment, heating element 91 is positioned adjacent microphone 23 and is configured to keep microphone 23 from building up ice in cold weather. In various embodiments, a plurality of heating elements 91 are positioned within breathbox 90 to warm all parts of breathbox 90. Heating element 91 may be configured as a pad that lines the inside of breathbox 90, or may also be configured to surround all or a portion of microphone 23. Heating element 91 is operably coupled to controller 50 and power source 40 and may be operated through manual controls using input device 114 or accessory button 124 or automatic controls using processor 51.

In various embodiments, heating element 91 may be controlled by one of input devices 114 or accessory button 124. A user input to either of input devices 114 or accessory button 124 may provide power to heating element 91 to warm breath box 90 and microphone 23. Heating element 91 may function at discrete temperature intervals (e.g. 50 degrees Fahrenheit, 60 degrees Fahrenheit, 70 degrees Fahrenheit, 80 degrees Fahrenheit), and may have temperature controlled by a user input. Alternatively, heating element 91 may be controlled automatically based upon an outside ambient temperature or an internal temperature of helmet 10. Alternatively, heating element 91 may operate at an infinite number of temperatures between a lower temperature bound an upper temperature bound. In various embodiments, the lower temperature bound and upper temperature bound may be determined by a user, or may be preset values. In an embodiment, the lower temperature bound is 32 degrees Fahrenheit and the upper bound is 80 degrees Fahrenheit. In various embodiments, the lower temperature bound is 50 degrees and the upper bound is 70 degrees. In various embodiments, heating element 91 may operate at a single temperature capable of melting any ice buildup around microphone 23.

Figure 18:
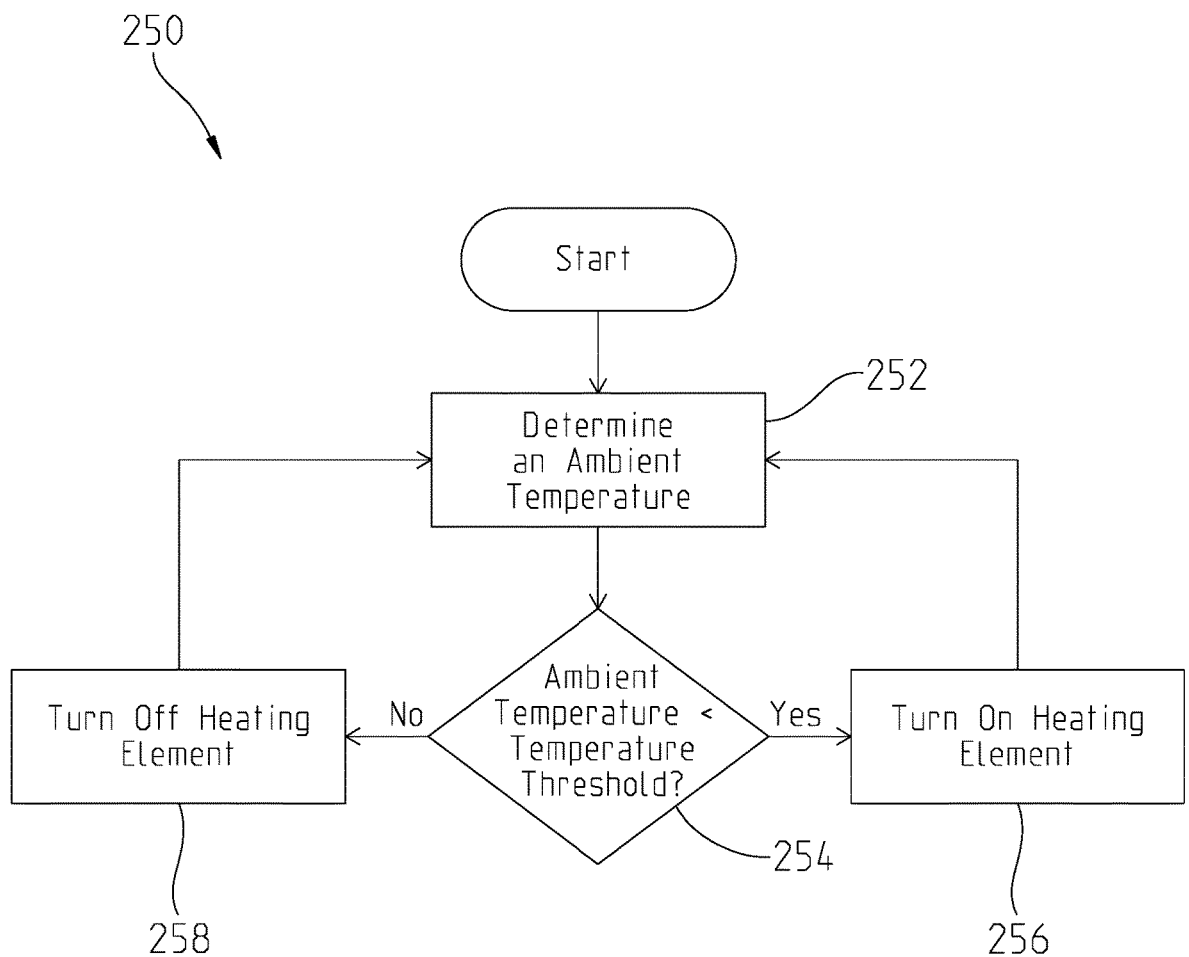
FIG. 18 is a processing sequence of a breathbox heating of the present disclosure.

Controller 50 may also be coupled to a thermometer, such as a thermocouple, to determine an ambient temperature outside helmet 10 or an internal temperature inside helmet 10. In various embodiments, controller 50 determines the ambient temperature from vehicle 2, mobile device 4, or network 71. Heating element 91 may be configured to automatically turn on if an ambient temperature or internal temperature falls below a predetermined temperature threshold. Referring now to FIG. 18, a processing sequence 250 of controller 50 may be used to automatically power the heating element 91 in appropriate circumstances. Illustratively, processing sequence 250 starts at block 252 and determines an ambient temperature using a thermometer and moves to block 254 to determine if the ambient temperature is below a predetermined temperature threshold. If block 254 determines that the ambient temperature is less than the predetermined temperature, heating elements 91 will be turned on in block 256 and processing sequence 250 will return to block 252. If block 254 determines that the ambient temperature is equal to or greater than the predetermined temperature, heating elements will be turned off in block 258. If heating elements 91 are already turned off, block 258 will verify that they are turned off and return to block 252.

In various embodiments, heating element 91 may be configured to only turn on when microphone 23 is actively being used. In various embodiments, heating element 91 may be configured to turn on for a period of time (e.g. 5 minutes) after the use of microphone 23. If the user speaks into microphone 23, controller 50 may instruct heating element 91 to turn on so that microphone 23 does not freeze over when it is being used. Further, heating element 91 may be powered using a duty cycle, so that heating element 91 cycles between an on state and an off state.

Biometric Sensors

Referring to FIG. 6, helmet 10 further includes biometric sensor 60 positioned on an inside of shell 12. Illustratively, biometric sensor 60 is positioned to be adjacent a forehead of a user. Biometric sensor 60 is positioned to be adjacent or pressed onto the skin of a user. In various embodiments, biometric sensor 60 may be placed adjacent or on a cheek of a user, a neck of user, a chin of user, or behind the ear of a user. Biometric sensor 60 includes a light 161 such as a light emitting diode (LED) and a photodiode 162. In various embodiments, biometric sensor 60 may comprise a plurality of lights 161 and a plurality of photodiodes 162. In various embodiments, biometric sensor 60 includes an optical sensor 163 and/or an infrared sensor 164. In various embodiments, biometric sensor 60 may have a plurality of lights 161 wherein each light emits a different wavelength. Photodiode 162 is configured to receive returning waves of light from light 161.

Biometric sensor 60, and each of lights 161, photodiode 162, optical sensor 164, and infrared sensor 164 are coupled to the controller 50 and configured to provide a biometric characteristic 165 pertaining to the user to controller 50. In the illustrated embodiment, biometric characteristic 165 may be a body temperature, a heart rate, a blood oxygen level, a respiration rate, or other biometric characteristic of the user. In various embodiments, each individual light 161, optical sensor 163 and infrared sensor 165 is configured to detect a separate biometric characteristic 165 (FIG. 19).

Fatigued Driver

Figure 19:
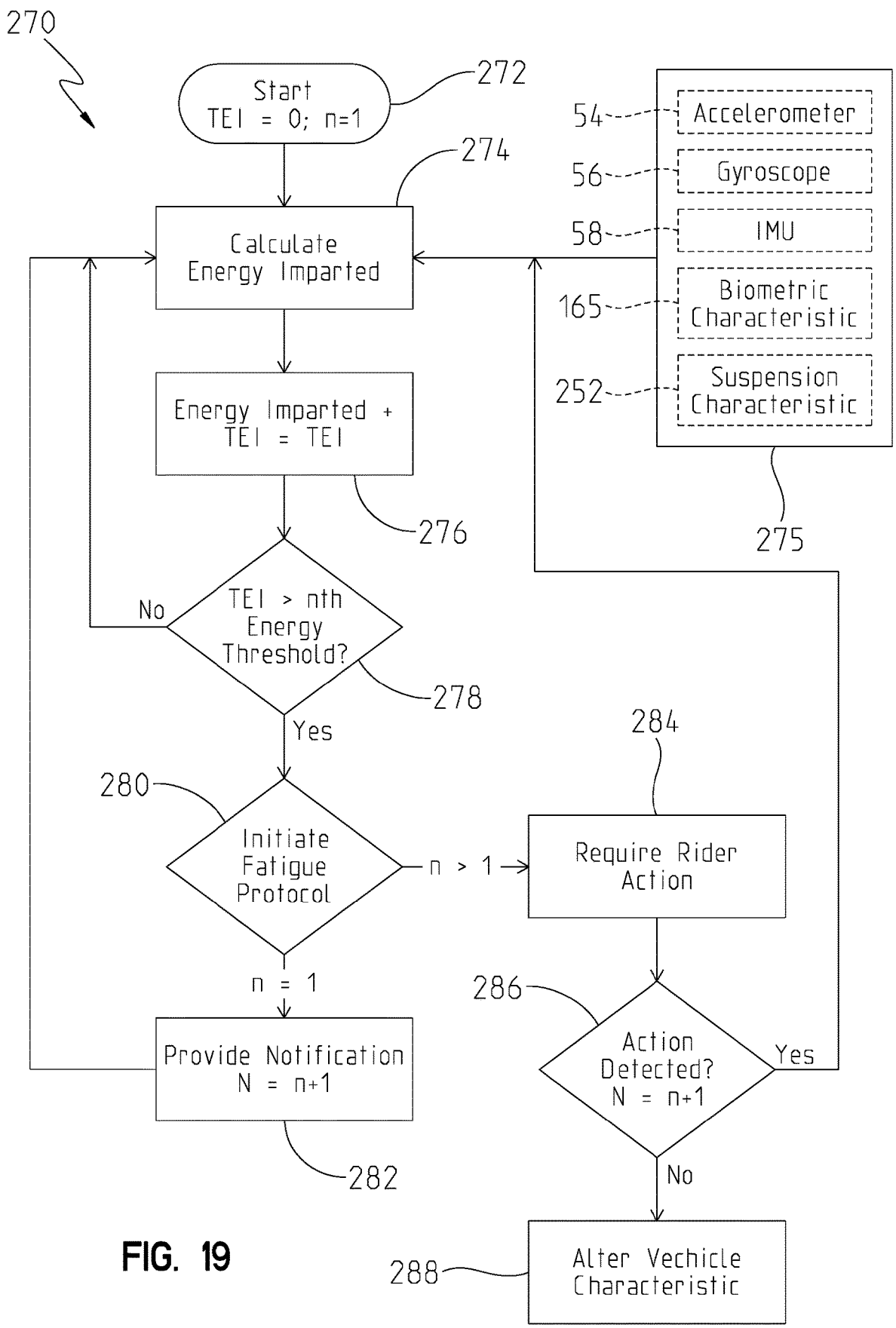
FIG. 19 is a processing sequence of a fatigue determination of the present disclosure.

Referring to FIG. 19, helmet 10 may further be configured to detect when a user becomes fatigued or is likely to become fatigued from riding on vehicle 2. In the illustrated embodiment, a user's fatigue may be monitored through processing sequence 270 of controller 50. Illustratively, processing sequence 270 starts with block 272 and the Total Energy Imparted (TEI) equal to 0, and an iteration value "n" equal to 0. Processing sequence 270 moves to block 274 to determine an amount of energy imparted during a certain event. A plurality of inputs 275 may be used in the determination of the energy imparted to the user. Inputs 275 may comprise signals from any or all of accelerometer 54, gyroscope 56, IMU 58, biometric characteristic 165, and a suspension characteristic 252.

Block 274 may determine energy imparted through a variety of methods. Accelerometer 54 may provide signals indicating an acceleration experienced by a user and/or a user's head. In the illustrated embodiment, a higher acceleration experienced indicates that a larger energy has been imparted to a user and will increase the value of the energy imparted in block 274. Gyroscope 56 may provide signals indicating an angular rotation, a roll rate, and a roll rate acceleration. In the event of a high angle of rotation, a high roll rate or high roll rate acceleration of a user's head or vehicle 2, a higher energy imparted will be determined in block 274. A higher roll rate indicates that a user's head or body has undergone large and/or quick orientation changes which may be disorienting and fatiguing. IMU 58 provides signals regarding at least acceleration and roll rate, and block 274 may determine the energy imparted using the acceleration values, the roll rate values, or a combination of the acceleration and roll rate values. In various embodiments, the IMU 58 determines an acceleration value, a angular rotation value, a roll rate value, and a roll rate acceleration value.

Any of biometric characteristics 165 may be used as an additional input to determine the energy imparted in block 274. A plurality of biometric characteristics may be used to determine if a user is under greater stress, and subject to greater fatigue during processing sequence 270. In various embodiments, an elevated heart rate may indicate a higher fatigue level, and a higher level of energy imparted may be determined in block 274. Alternatively, a reduced heart rate may indicate a user is sleepy. Suspension system 204 may further comprise a plurality of suspension characteristics 252, which may include a shock height, a damping level, a compression level, a rebound level, a shock acceleration, or a shock velocity. In various embodiments, a single suspension characteristic 252 or a plurality of suspension characteristics 252 may be used in the determination of energy imparted in block 274.

The determination of energy imparted in block 274 may include a single input 275, or may alternatively include a plurality of inputs 275. In various embodiments, each of the inputs 275 may be weighted differently so that a signal from one input 275 may be weighted higher than another input 275 (e.g. a roll rate may create a higher energy imparted in block 274 than an acceleration value). In various embodiments, helmet 10 may automatically determine which of inputs 275 are able to provide signals to block 274, that is, if helmet 10 includes an accelerometer 54, and not a gyroscope 56, block 274 will not receive inputs from gyroscope 56. In various embodiments, controller 50 may receive signals from any of accelerometer 54, gyroscope 56, or IMU 58 within helmet 10, as well as signals from an accelerometer, gyroscope, or IMU within vehicle 2 and compare the values. A difference in values between an accelerometer 54 within helmet 10 and an accelerometer within vehicle 2 may demonstrate that the rider is experiencing less or more harsh conditions, and the energy imparted may be adjusted accordingly. Further, a difference in values between gyroscope 56 and a gyroscope within vehicle or a difference in values between IMU 58 and the IMU in vehicle 2 may demonstrate that the rider is experiencing less or more harsh conditions.

In the illustrated embodiment, block 274 receives input signals from inputs 275 and determines an Energy Imparted value. This may be done through an integration process, a multiplier process, an additive process, a filter process, or other mathematical process to accumulate an Energy Imparted value. In various embodiments, block 274 determines the Energy Imparted value over a period of time, the period of time may be 0.01 seconds or shorter, 0.1 seconds, 1 second, 10 seconds, or longer. In various embodiments, the period of time may be lengthened if power source 40 is non-constant or at a low charge. In various embodiments, the period of time may be shortened if power source 40 is constant or fully charged.

Still referring to FIG. 18, after the Energy Imparted value is determined in block 274, processing sequence 270 moves to block 276, and the Energy Imparted value is added to the TEI to create a new TEI value. That is, block 276 determines "Energy Imparted+TEI=TEI". Processing sequence 270 moves to block 278 to determine if the Total Energy Imparted (TEI) is greater than an Energy Threshold. The Energy Threshold may be a predetermined value, or it may be a dynamic value. In the illustrated embodiment, processing sequence 270 includes a plurality of Energy Threshold values, wherein each iteration "n" of process 270 includes a different Energy Threshold value. In the illustrated embodiment, each successive iteration includes a greater Energy Threshold value (e.g. $1^{st}$ Energy Threshold<$2^{nd}$ Energy Threshold<$3^{rd}$ Energy Threshold). If block 278 determines that the TEI is greater than the Energy Threshold, processing sequence 270 proceeds to decision block 280 and initiates a Fatigue Protocol. If block 278 determines that the TEI is not greater than the Energy Threshold, processing sequence 270 proceeds to block 274 and continues to determine Energy Imparted and accumulate the determined Energy Imparted in block 276. In various embodiments, the Energy Imparted is a dimensionless quantity. In various embodiments, the Energy Imparted is a measurement of Energy (Joules), a measurement of Power (Watts), or other appropriate measurement.

Fatigue Protocol in decision block 280 determines which iteration "n" process 270 is currently processing. If Fatigue Protocol determines processing sequence 270 is on the first iteration, that is n=1, decision block 280 proceeds to block 282. Block 282 provides a notification to a user of helmet 10. In various embodiments, the notification may be a high-volume noise alert coming through speakers 22, or a speaker of vehicle 2. An exemplary embodiment of a speaker system for vehicle 2 may be found in U.S. application Ser. No. 16/522,957, filed Jul. 26, 2019, titled AUDIO SYSTEM FOR A UTILITY VEHICLE, the entire disclosure of which is expressly incorporated herein by reference. The notification of block 282 may further be a vibration from helmet 10, or a vibration from vehicle 2. A vibration from vehicle 2 may come from a vibration from the electronic power steering (EPS) unit of steering system 202 to provide a vibration through the steering input to a user's hands. An exemplary embodiment of using an EPS unit to create a vibration through a steering input can be found in U.S. application Ser. No. 17/410,781, filed Aug. 24, 2021, titled VEHICLE STEERING SYSTEMS AND METHODS, the entire disclosure of which is expressly incorporated herein by reference. In another embodiment, the notification of block 282 may be displayed on a display of vehicle 2. Notification may be a message, an image, a video, or a flashing screen, or other type of display configured to get the attention of a rider or driver. After providing a notification in block 282, process 270 adding 1 to iteration "n", such that "n=n+1", and process 270 moves back to block 274.

Still referring to FIG. 19, if decision block 280 determines that processing sequence 270 is on a second, or greater, iteration, decision block 280 moves to block 284, where a rider action is required. The rider action may be any number of various actions that require an operator of vehicle 2 to demonstrate that the operator is paying attention. The rider action may require the operator to press or actuate one of inputs 114 or accessory button 124. Further, the rider action may be actuating an input on vehicle 2, such as an input on a display or touchscreen, an input on a steering input, or an input within the operator area of vehicle 2. Process 270 detects the rider action in a subprocess 286, illustrated in FIG. 19.

Figure 20:
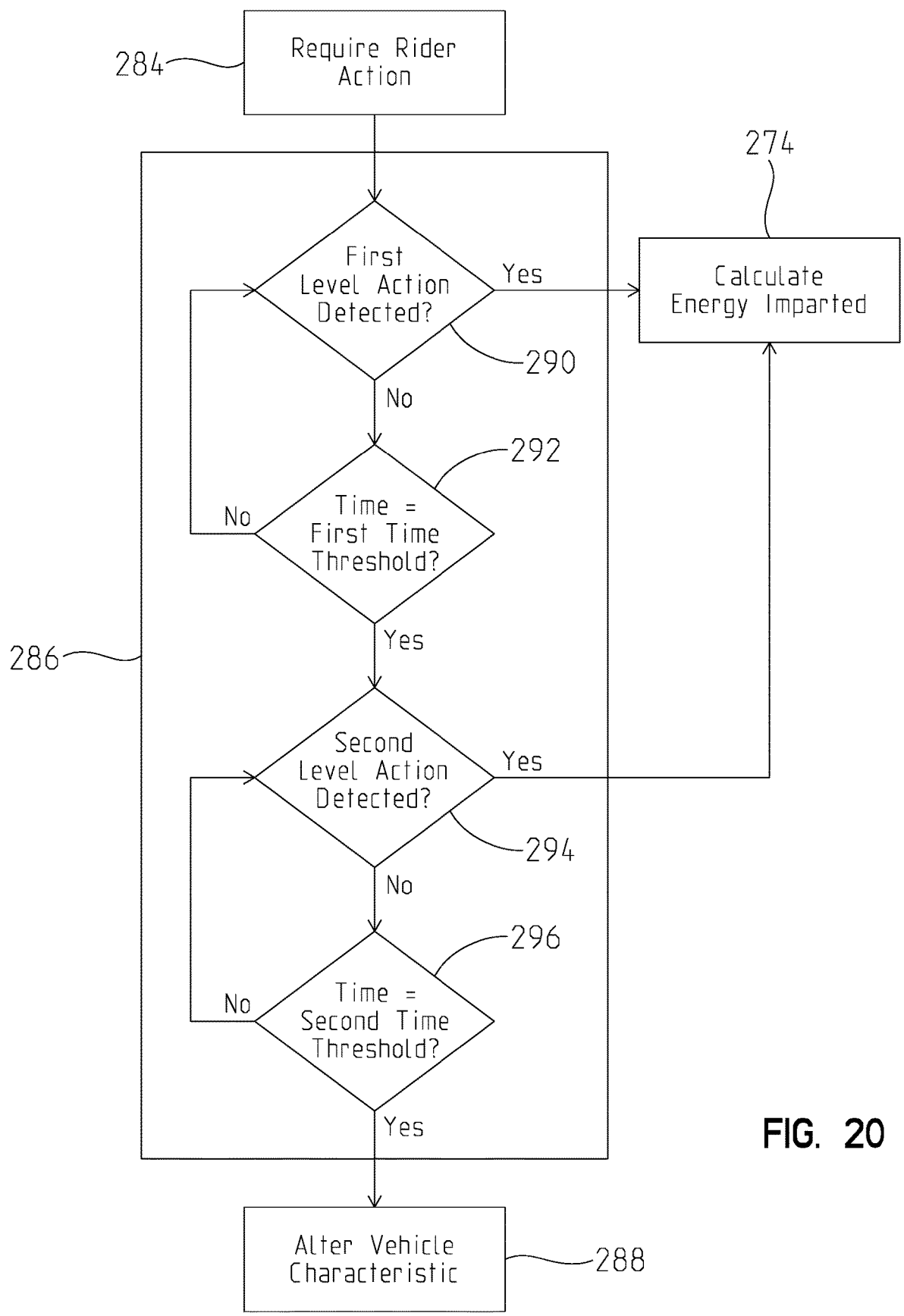
FIG. 20 is a processing sequence of a leveled alert of the present disclosure.

Referring to FIG. 20, subprocess 286 starts with decision block 290, and determines if a first level action is completed, wherein the first level action may be a required input as previously described, such as an input to input devices 114 or accessory button 124, or an input to vehicle 2. If decision block 290 determines that the first level action has not been completed within a first time threshold in decision block 292, subprocess 286 moves to decision block 294. Decision block 294 determines if a second level action is completed, wherein the second level action may be a required input as previously described accompanied by an alert or notification, such as found in block 282. If decision block 296 determines that the second level action has not been completed within a second time threshold in decision block 296, subprocess 286 moves to block 288 where a characteristic of vehicle 2 may be altered.

Subprocess 268 provides an escalation technique to verify a rider is aware of their potential fatigue level. The second level action may be configured to be louder, brighter, or otherwise more noticeable than the first level action, so that if a rider does not notice the required first level action, they may more easily notice the required second level action. In various embodiments, subprocess 268 may comprise more than a first and second level action (e.g. no response to the second level action may move subprocess 268 to a third level action). In various embodiments, subprocess 268 includes only a first level action. In the illustrated embodiment, within subprocess 286, the first time threshold and second time threshold may be a minute, may be two minutes, or may be any other suitable time period suitable to get the attention of a rider. In various embodiments, the first time threshold may be longer than the second threshold. In various embodiments, the second time threshold may be greater than the first time threshold. In the illustrated embodiment, altering a vehicle characteristic in block 288 may comprise limiting a speed of vehicle 2, limiting a throttle valve angle associated with an internal combustion engine, limiting an engine speed or electric motor rotation, or otherwise slow vehicle 2 or completely stop vehicle 2.

Referring still to FIGS. 19-20, processing sequence 270 is an iterative process, and provides an accumulation of Energy Imparted on the user of helmet 10. In various embodiments, processing sequence 270 may be started with an ignition, or starting sequence, of vehicle 2. In various embodiments, processing sequence 270 may be automatically started at the beginning of each day and run for the entirety of the day (i.e. 24 hours; 12:00 a.m. to 11:59 pm). In various embodiments, processing sequence 270 may initiate at an ignition, or start sequence, of vehicle 2 only after a determined rest time has passed since vehicle 2 was most recently turned off. In this way, processing sequence 270 may distinguish between a rider who has taken a small break, and a rider who has taken a sufficiently long break. In various embodiments, the rest time may be 1 hour, 2 hours, 3 hours, 6 hours, 12 hours, 24 hours, or more. In various embodiments, the rest time may be a user defined value.

In the illustrated embodiment, a failure to provide a first level action or a second level action with block 290 and 294 notifies a member or all members of first group 120. In various embodiments, when block 282 is reached, a notification may be sent to a member or all members of first group 120 that a user has reached the first energy threshold. In various embodiments, the notification may be a prompt on a display of other vehicles within first group 120, may be an audible notification at any of the other vehicles within first group 120, or may be an audible notification at another helmet 10 or secondary devices 11 within first group 120. In various embodiments, process 270 may have a first configuration for off road driving and a second configuration for on road driving. For an off road configuration, a user's head may experience greater shocks or movement than an on road configuration. In various embodiments, an off road configuration may have higher energy imparted thresholds than an on road configuration. In various embodiments, an on road configuration may place a higher Energy Imparted value on a head rotation which may indicate a drowsy driver or rider.

In the illustrated embodiment, processing sequence 270 may be refined using machine learning. Machine learning may analyze the severity of inputs 275 and the quickness of responses from the user during the Fatigue Protocol to alter the Energy Thresholds within block 278, as well as the time thresholds found in subprocess 268. In various embodiments, if a user responds quickly to the First Level Action request in block 292, machine learning may determine that the Energy Thresholds may need to be increased. Further, machine learning may also analyze rider head position and determine a standard head position. The current head position may then be analyzed with reference to the standard head position, and differences between the current head position and standard head position may be measured and recorded and/or aggregated as an input 275.

In the illustrated embodiment, the data collected from helmet 10 may be transmitted over network controller 70 to a network 71. In various embodiments, the data collected from helmet 10 may be transmitted to a collective group of data from multiple helmets 10, and machine learning may alter Energy Thresholds and time thresholds for all users based upon the collective group of data. A user of helmet 10 may be required to opt-in to sharing data with network 71.

Wireless Charging Visor

Figure 21:
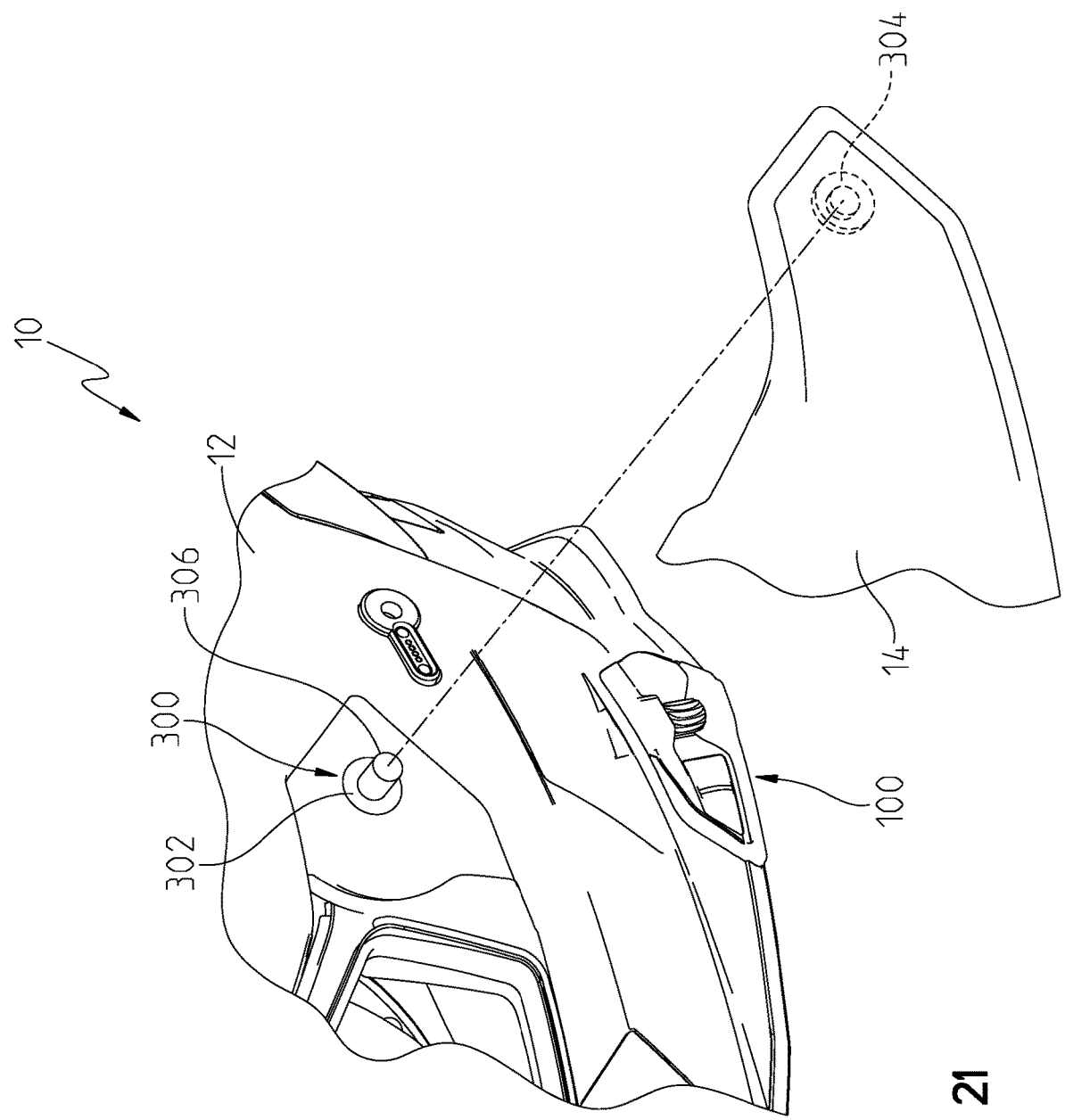
FIG. 21 is an exploded perspective view of a portion of the visor of the helmet of FIG. 1.
Figure 22:
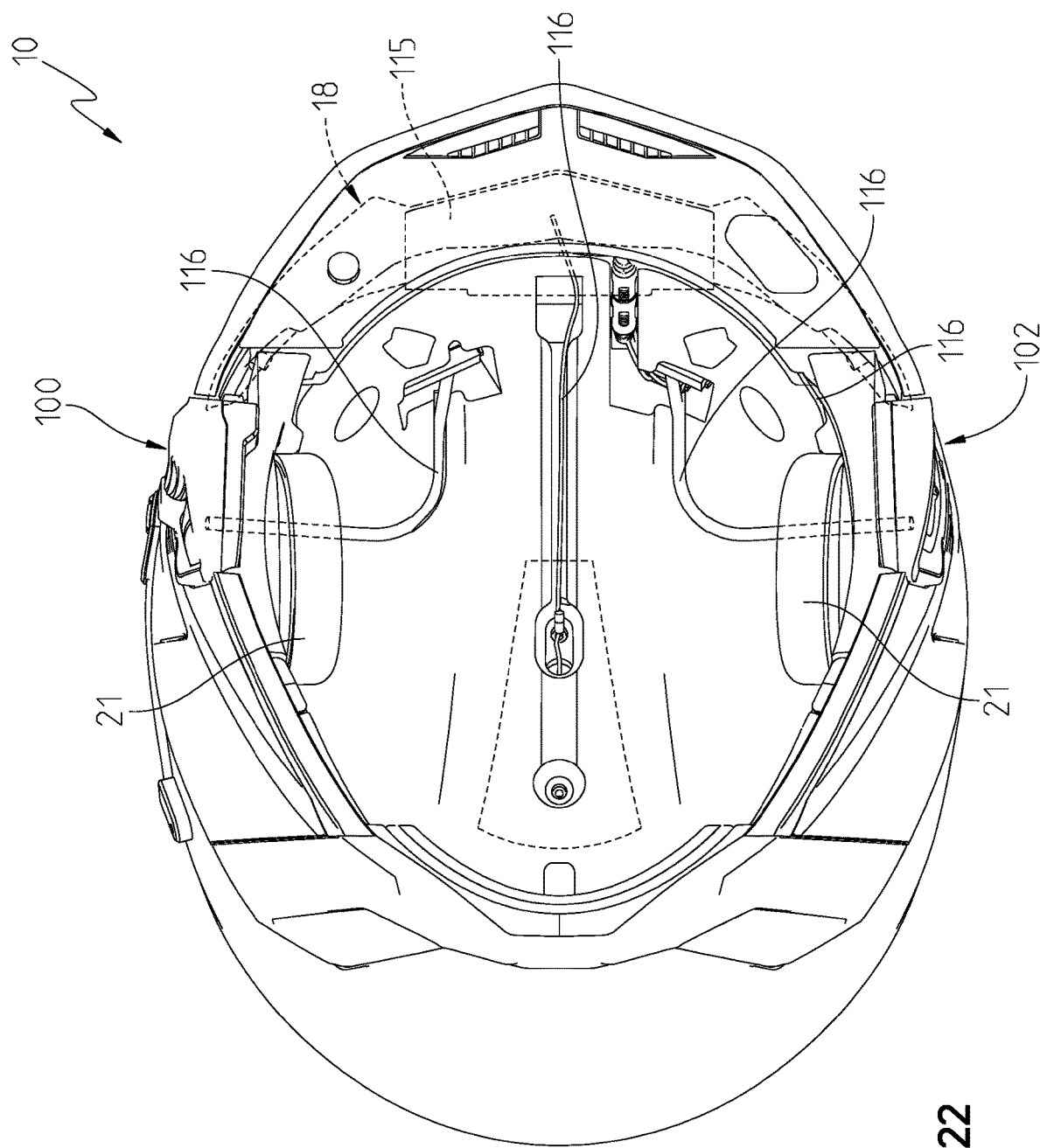
FIG. 22 is a bottom up view of the electrical system of the helmet of FIG. 1.

Referring to FIG. 21, visor 14 may be powered through a wireless charging system 300. Illustratively, wireless charging system 300 includes a transmitter 302 in shell 12 and a receiver 304 in visor 14. Further, transmitter 302 is operably coupled to power source 40 and receiver 304 is coupled to a heating element in visor 14. In various embodiments, the heating element in visor 14 is a resistive heating element positioned within visor 14, or on an inside or outside of visor 14.

In the illustrated embodiment, transmitter 302 may be a plurality of copper coils configured to create a magnetic field and induce a current in receiver 304 to provide power to visor 14. In the illustrated embodiment, coils of transmitter 302 are concentric with the visor pivot axis 15. Further, transmitter 302 is aligned with receiver 304 when visor 14 is rotatably coupled to shell 12, and are spaced from each other less than 10 mm. In various embodiments, transmitter 302 and receiver 304 are spaced apart less than 5 mm. In the illustrated embodiment, transmitter 302 and receiver 304 are both circular and wireless charging system 300 is configured to provide wireless power to visor 14 throughout an entire rotation of visor 14 relative to shell 12. In various embodiments, the coils of transmitter 302 may be larger than the receiver 304. In various embodiments, the receiver 304 may be larger than the coils of transmitter 302.

Still referring to FIG. 21, wireless charging system 300 may comprise a charging post 306. Charging post 306 may provide a point for helmet 10 to be charged or powered by an external power source. In various embodiments, the charging post 306 is coupled to an integrated helmet power source 40. Transmitter 302, receiver 304, and charging post 306 are constructed of a copper material. In various embodiments, transmitter 302, receiver 304, and charging post 306 are constructed of any electrically conductive material.

Now referring to FIG. 21, helmet 10 includes electrical wires 116. In the illustrated embodiment, electrical wires are coupled to electronics within spoiler 16 and extend forward from spoiler 16 along the inside of shell 12, and outward to speakers 22, left pod 100 and right pod 102. Additionally, an electrical wire 116 extends forward along an inside and top of shell 12 to accessory mounting portion 30. In various embodiments, an electrical wire 116 extends generally along lower edge 13 of shell 12 to microphone 23.

EXAMPLES

The following are non-limiting exemplary examples of the present disclosure.

Example 1. A helmet may comprise a shell including an opening; a first controller supported by the shell; and a pod operatively coupled to the first controller. The pod may comprise an input device which provides an input to the first controller. The pod may be receivable within the opening.

Example 2. The helmet of Example 1, wherein the shell may further comprise a lower edge. The opening may intersect the lower edge.

Example 3. The helmet of Example 1, wherein the pod may include at least one of a radio, a wireless network controller, and a global positioning system.

Example 4. The helmet of Example 1, wherein the pod may be wirelessly coupled to a second controller. The second controller may be one of a second helmet, a vehicle, and a mobile device.

Example 5. The helmet of Example 4, wherein the pod may provide a set of instructions to the second controller.

Example 6. The helmet of Example 5, wherein the set of instructions may include one of a speed limit, a geofence, and a communication pathway.

Example 7. A helmet may comprise a shell; a battery supported by the helmet; a mounting assembly positioned on the shell; and an accessory received by the mounting assembly. The mounting assembly may comprise an electrical connection coupled to the battery. The accessory may be configured to be coupled to the battery through the electrical connection.

Example 8. The helmet of Example 7, wherein the mounting assembly may be positioned at an upper extent of the shell.

Example 9. The helmet of Example 7, may further comprise a user input supported by the shell. The user input may be electrically coupled to the electrical connection.

Example 10. The helmet of Example 9, may further comprise a controller supported by the shell. The controller may coupled intermediate the user input and the accessory. The controller may alter an accessory characteristic of the accessory in response to an actuation of the user input.

Example 11. A method of controlling a vehicle characteristic of a recreational vehicle may comprise providing a helmet configured to support a controller and a user input, wherein the user input is operatively coupled to the controller, and the user input provides an input signal to the controller in response to an actuation of the user input; coupling the helmet to the vehicle through a wireless connection; and transmitting an output signal from the controller to the vehicle in response to the controller receiving the input signal. The output signal may be configured to alter the vehicle characteristic.

Example 12. The method of Example 11, may further comprise presenting a list of vehicle characteristics on a user interface remote from the helmet; receiving a selection of a first vehicle characteristic from the list of vehicle characteristics; and mapping the user input of the helmet to the selected vehicle characteristic such that an actuation of the user input of the helmet alters the selected vehicle characteristic.

Example 13. The method of Example 12, wherein the user interface may be supported by the recreational vehicle.

Example 14. The method of Example 12, wherein the selected vehicle characteristic may be one of a lighting characteristic, a suspension characteristic, a steering characteristic, a drivetrain characteristic.

Example 15. The method of Example 11, may further comprise actuating the user input of the helmet a second time within a predetermined time after the first actuation of the user input; and altering a second vehicle characteristic in response to the second actuation of the user input.

Example 16. A method of operating a plurality of helmets may comprise providing a first group of helmets comprising a first helmet and a second helmet and a second group of helmets comprising a third helmet and a fourth helmet; providing a first wireless connection between the first helmet and the second helmet, a second wireless connection between the third helmet and the fourth helmet and a third wireless connection between the second helmet and the third helmet; and communicating a first information between the first helmet and the fourth helmet by the steps of: transmitting the first information over the first wireless connection from the first helmet to the second helmet, transmitting the first information over the third wireless connection from the second helmet to the third helmet, and transmitting the first information over the second wireless connection from the third helmet to the fourth helmet.

Example 17. The method of Example 16, wherein the first wireless connection and second wireless connection may be a first type of wireless communication method. The third wireless connection may be a second type of wireless communication method.

Example 18. The method of Example 16, may further comprise providing a first light coupled to the first helmet, a second light coupled to the second helmet, a third light coupled to the third helmet, and a fourth light coupled to the fourth helmet; displaying a first light characteristic at the first light and the second light; communicating the first light characteristic over the third wireless connection; and displaying a second light characteristic at the third light and the fourth light, and the second light characteristic is different from the first light characteristic.

Example 19. The method of Example 18, wherein the first light characteristic and the second light characteristic may be one of a light color and a flash sequence.

Example 20. The method of Example 17, wherein the second type of wireless communication method may have a longer range than the first type of wireless communication method.

Example 21. The method of Example 20, wherein the first type of wireless communication may be a Bluetooth communication method and the second type of wireless communication may be a wi-fi or a cellular connection.

Example 22. The method of Example 16, wherein the first information may be an audio information.

Example 23. A method of controlling an accessory may comprise providing a helmet including a user actuatable input and a controller operatively coupled to the user actuatable input; providing a user interface communicatively coupled to the controller; providing a plurality of accessories, wherein each accessory has an accessory characteristic; presenting a plurality of indicia on the user interface, the plurality of indicia comprising the plurality of accessories; selecting one of the accessories of the plurality of accessories with the user interface; and mapping the user actuatable input of the helmet to the selected one of the plurality of accessories such that after mapping a first user actuation of the user actuatable input of the helmet alters the accessory characteristic of the selected one of the plurality of accessories.

Example 24. The method of Example 23, wherein at least one of the accessories of the plurality of accessories may be supported by the helmet.

Example 25. The method of Example 23, wherein at least one of the accessories of the plurality of accessories may be physically separated from the helmet.

Example 26. The method of Example 23, may further comprise providing a power source coupled to the helmet; and actuating the user actuatable input provides power to the selected accessory.

Example 27. The method of Example 26, wherein the selected accessory may comprise a heating element.

Example 28. The method of Example 23, may further comprise altering an accessory characteristic of a second accessory of the plurality of accessories in response to a second user actuation of the user actuatable input within a predetermined time after the first user actuation of the user actuatable input.

Example 29. A helmet to be worn by a passenger of a vehicle may comprise a shell; a sensor supported by the shell, the sensor configured to monitor at least one of a passenger characteristic and a vehicle characteristic; and a controller operatively coupled to the sensor. The controller may be configured to receive an input from the sensor and determine based on the input an amount of energy imparted to the passenger. The controller may further be configured to when the energy imparted to the passenger reaches a first energy threshold to at least one of: (i) provide an audio, visual, or tactile alert to the passenger; and (ii) alter a vehicle characteristic.

Example 30. The helmet of Example 29, wherein the sensor may be one of an accelerometer, a gyroscope, an inertial measurement unit, a biometric sensor, and a suspension sensor.

Example 31. The helmet of Example 29, wherein if the energy imparted reaches a second energy threshold, the controller may be configured to request a first user input within a first time threshold, and if a user input is not received within the first time threshold, the controller may be further configured to request a second user input within a second time threshold.

Example 32. The helmet of Example 31, wherein if a user input is not received with second time threshold, the controller may be configured to alter the vehicle characteristic.

Example 33. The helmet of Example 31, wherein the requested first user input may be a request to provide an input to a user interface of the vehicle.

While this invention has been described as having an example design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A helmet comprising:
   a shell including an opening in a left side of the shell or a right side of the shell;
   a controller supported by the shell; and
   a pod operatively coupled to the controller, the pod comprising an input device configured to provide an input to the controller, the pod being receivable within the opening.

2. The helmet of claim 1, wherein the shell further comprises a lower edge, and the opening intersects the lower edge.

3. The helmet of claim 1, wherein the pod includes at least one of a radio, a wireless network controller, or a global positioning system.

4. The helmet of claim 1, wherein:
   the controller is a first controller; and
   the pod is wirelessly coupled to a second controller, the second controller comprising one of a second helmet, a vehicle, or a mobile device.

5. The helmet of claim 4, wherein the pod is configured to provide a set of instructions to the second controller.

6. The helmet of claim 5, wherein the set of instructions includes one of a speed limit, a geofence, or a communication pathway.

7. The helmet of claim 1, further comprising a visor configured to rotate about a pivot axis, the pivot axis extending horizontally between the left side of the shell and the right side of the shell, the pod being positioned vertically below the pivot axis.

8. The helmet of claim 1, wherein:
   the opening is a first opening in one of the left side of the shell or the right side of the shell;
   the helmet further comprises a second opening in the other of the left side of the shell or the right side of the shell; and
   the helmet further comprises a second pod receivable within the second opening.

9. A method of controlling a recreational vehicle, the method comprising:
   providing a helmet configured to support a controller and a user input, wherein the user input is operatively coupled to the controller, and the user input provides an input signal to the controller in response to an actuation of the user input;
   presenting a list of selectable vehicle characteristics on a user interface remote from the helmet, the selectable vehicle characteristics comprising at least one of a lighting light color, a lighting flash sequence, a suspension characteristic, a steering characteristic, or a drivetrain characteristic;
   receiving a selection of a selected vehicle characteristic from the list of selectable vehicle characteristics;
   mapping the user input of the helmet to the selected vehicle characteristic such that an actuation of the user input of the helmet alters the selected vehicle characteristic;
   coupling the helmet to the recreational vehicle through a wireless connection; and
   transmitting an output signal from the controller to the recreational vehicle in response to the controller receiving the input signal, the output signal configured to alter the selected vehicle characteristic of the recreational vehicle, the selected vehicle characteristic comprising at least one of a lighting light color, a lighting flash sequence, a suspension characteristic, a steering characteristic, or a drivetrain characteristic, wherein:

the suspension characteristic comprises at least one of a shock height, a damping level, a compression level, a rebound level, a shock acceleration, or a shock velocity;

the steering characteristic comprises an electronic power steering mode; and the drivetrain characteristic comprises a drive mode of a drivetrain of the recreational vehicle.

10. The method of claim 9, wherein the user interface is supported by the recreational vehicle.

11. The method of claim 9, wherein:

the actuation of the user input is a first actuation of the user input; and the method further comprises:

actuating the user input of the helmet a second time within a predetermined time after the first actuation of the user input; and altering a second vehicle characteristic in response to a second actuation of the user input.

12. The method of claim 9, wherein an actuation of the user input is configured to cycle through a plurality of vehicle characteristics.

* * * * *